United States Patent
Kim et al.

(10) Patent No.: US 9,330,180 B2
(45) Date of Patent: May 3, 2016

(54) MOBILE TERMINAL AND METHOD OF CONTROLLING THE SAME

(75) Inventors: Tae Hun Kim, Incheon-si (KR); Jang Jae Jung, Seoul (KR)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 396 days.

(21) Appl. No.: 12/242,208

(22) Filed: Sep. 30, 2008

(65) Prior Publication Data

US 2009/0094206 A1    Apr. 9, 2009

(30) Foreign Application Priority Data

Oct. 2, 2007 (KR) .................. 10-2007-0099411
Mar. 17, 2008 (KR) .................. 10-2008-0024357

(51) Int. Cl.

| G06F 3/048 | (2013.01) |
|---|---|
| G06F 17/30 | (2006.01) |
| G06F 3/0488 | (2013.01) |
| H04M 1/725 | (2006.01) |

(52) U.S. Cl.
CPC ...... *G06F 17/30867* (2013.01); *G06F 3/04886* (2013.01); *H04M 1/72522* (2013.01); *H04M 1/72561* (2013.01); *H04M 2250/70* (2013.01)

(58) Field of Classification Search
CPC ............ G06F 3/04886; G06F 3/04842; G06F 3/0482; G06F 3/04883; G06F 3/04847
USPC .......................... 715/773, 841, 864
See application file for complete search history.

(56) References Cited

U.S. PATENT DOCUMENTS

| 5,422,656 | A |  | 6/1995 | Allard et al. |
|---|---|---|---|---|
| 5,615,384 | A |  | 3/1997 | Allard et al. |
| 6,078,314 | A |  | 6/2000 | Ahn |
| 6,307,541 | B1 | * | 10/2001 | Ho et al. ................. 345/171 |
| 7,389,221 | B1 | * | 6/2008 | Pearson et al. .............. 704/2 |
| 7,669,142 | B2 | * | 2/2010 | Ray et al. ................. 715/825 |
| 7,787,916 | B2 | * | 8/2010 | Hamamura et al. ....... 455/575.3 |

(Continued)

FOREIGN PATENT DOCUMENTS

| CN | 1196526 A | 10/1998 |
|---|---|---|
| CN | 1588367 A | 3/2005 |

(Continued)

OTHER PUBLICATIONS

"Windows Search Guide in IE7", http://blogs.msdn.com/b/ie/archive/2006/10/23/windows-search-guide-in-ie7.aspx, posted Oct. 23, 2006.*

(Continued)

*Primary Examiner* — Ajay Bhatia
*Assistant Examiner* — Haimei Jiang
(74) *Attorney, Agent, or Firm* — Judy Yee; Micky Minhas

(57) ABSTRACT

A mobile terminal and method of controlling the same are disclosed, by which a terminal user is enabled to input specific commands to the mobile terminal with minimum effort in a manner of configuring a display screen with consideration of enhanced user's convenience. The present invention includes a display unit, a wireless communication unit for an internet access, a user input unit for receiving an input from a user, and a control unit controlling both a text input box and an indicator indicating one selected from the group consisting of at least two functions of the text input box to be displayed on a standby image of the display unit.

20 Claims, 21 Drawing Sheets

(56) References Cited

U.S. PATENT DOCUMENTS

| | | | |
|---|---|---|---|
| 8,000,750 B2* | 8/2011 | Honda et al. | 455/566 |
| 8,117,195 B1 | 2/2012 | Dave et al. | |
| 2002/0087748 A1* | 7/2002 | Park et al. | 710/1 |
| 2003/0001816 A1* | 1/2003 | Badarneh | 345/156 |
| 2003/0092400 A1 | 5/2003 | Shimabukuro | |
| 2003/0128188 A1* | 7/2003 | Wilbrink et al. | 345/158 |
| 2004/0061720 A1* | 4/2004 | Weber | 345/760 |
| 2004/0135774 A1* | 7/2004 | La Monica | 345/174 |
| 2004/0139480 A1* | 7/2004 | Delpuch et al. | 725/135 |
| 2005/0026657 A1* | 2/2005 | Hasegawa et al. | 455/566 |
| 2005/0085215 A1* | 4/2005 | Kokko et al. | 455/404.1 |
| 2006/0080303 A1 | 4/2006 | Sargent et al. | |
| 2006/0107231 A1* | 5/2006 | Matthews et al. | 715/788 |
| 2006/0187211 A1 | 8/2006 | Uusitalo et al. | |
| 2006/0242129 A1* | 10/2006 | Libes et al. | 707/3 |
| 2006/0277482 A1 | 12/2006 | Hoffman et al. | |
| 2006/0281448 A1* | 12/2006 | Plestid et al. | 455/418 |
| 2007/0027848 A1 | 2/2007 | Howard et al. | |
| 2007/0204232 A1 | 8/2007 | Ray et al. | |
| 2007/0233692 A1 | 10/2007 | Lisa et al. | |
| 2008/0005668 A1* | 1/2008 | Mavinkurve et al. | 715/526 |
| 2008/0028292 A1* | 1/2008 | Graham et al. | 715/230 |
| 2008/0115124 A1* | 5/2008 | Remer | 717/178 |
| 2008/0122796 A1* | 5/2008 | Jobs et al. | 345/173 |
| 2008/0139227 A1* | 6/2008 | Wong et al. | 455/466 |
| 2008/0189591 A1* | 8/2008 | Lection | 715/202 |
| 2008/0215307 A1* | 9/2008 | Li et al. | 704/3 |
| 2008/0235187 A1* | 9/2008 | Gade et al. | 707/3 |
| 2008/0320419 A1 | 12/2008 | Matas et al. | |

FOREIGN PATENT DOCUMENTS

| | | |
|---|---|---|
| CN | 1761190 A | 4/2006 |
| JP | 2005-100199 A | 4/2005 |
| JP | 2006-302184 A | 11/2006 |
| KR | 10-2006-0058320 A | 5/2006 |
| KR | 10-2007-0045645 A | 5/2007 |
| KR | 10-2007-0054004 A | 5/2007 |
| TW | M240740 U | 8/2004 |
| TW | I260138 B | 8/2006 |
| TW | I286204 B | 9/2007 |
| WO | WO 2007/059503 A1 | 5/2007 |

OTHER PUBLICATIONS

"Searching is better in Beta 2!", http://blogs.msdn.com/b/ie/archive/2006/02/07/527266.aspx, posted Feb. 7, 2006.*

"Google Power Tools Bible", Ted Coombs; Roderico DeLeon, Mar. 12, 2007.*

"Google desktop 5.1.706.29690", Jul. 2007, http://www.filehorse.com/download-google-desktop/1420/screenshots/.*

"Google and Other Search Engines: visual Quickstart Guide", Diane Poremsky, May 11, 2004, 3 pages.*

"Google Power Tools Bible", Ted Coombs, Mar. 12, 2007, 5 pages.*

Mozilla, "Internet Keywords", URL://http://replay.waybackmachine.org/20061112030251/http://www.mozilla.org/docs/end-user/ internet-keywords.html; retrieved on Mar. 4, 2011, Nov. 12, 2006, XP-002627372.

"iPhone's Disappearing spacebar," https://signalvnoise.com/posts/492-iphones-disappearing-spacebar, 9 pages, Jun. 28, 2007 (XP055020475).

United States Patent and Trademark Office, Final Office Action Issued in U.S. Appl. No. 13/669,138, Dec. 18, 2015, 13 pages.

European Patent Office, Office Action Issued in European Patent Application No. 08164742.2, Jan. 25, 2016, Netherlands, 8 pages.

\* cited by examiner

MOBILE TERMINAL AND METHOD OF CONTROLLING THE SAME

CROSS REFERENCE TO RELATED APPLICATIONS

This application claims the benefit of the Korean Patent Application Nos. 10-2008-0024357, filed on Mar. 17, 2008, and 10-2007-0099411 filed on Oct. 2, 2007 which are hereby incorporated by reference as if fully set forth herein.

BACKGROUND OF THE INVENTION

1. Field of the Invention

The present invention relates to a mobile terminal, and more particularly, to a mobile terminal) computer program product and method of controlling the same. Although the present invention is suitable for a wide scope of applications, it is particularly suitable for configuring a display screen to enhance user's convenience.

2. Discussion of the Related Art

A mobile terminal is a device which may be configured to perform various functions. Examples of such functions include data and voice communications, capturing images and video via a camera) recording audio, playing music files via a speaker system, and displaying images and video on a display. Some terminals include additional functionality which supports game playing, while other terminals are configured as multimedia players. More recently, mobile terminals have been configured to receive broadcast and multicast signals which permit viewing of content such as videos and television programs.

Efforts are ongoing to support and increase the functionality of mobile terminals. Such efforts include software and hardware improvements, as well as changes and improvements in the structural components which form the mobile terminal.

Recently, various terminals equipped with touchscreens, via which various commands can be inputted, have been introduced.

Hence, it is necessary to discuss how to facilitate a user to input various commands with a prescribed configuration of a display screen or a touchscreen.

SUMMARY OF THE INVENTION

Accordingly, the present invention is directed to a mobile terminal, computer program product and method of controlling the same that substantially obviate one or more problems with the conventional mobile terminals due to limitations and disadvantages of the related art.

An object of the present invention is to provide a mobile terminal, computer program product and method of controlling the same, by which a terminal user is enabled to input specific commands to the mobile terminal with minimum effort in a manner of configuring a display screen with consideration of enhanced user's convenience.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a mobile terminal according to one embodiment of the present invention includes a display unit, a wireless communication unit for an internet access, a user input unit for receiving an input from a user, and a controller configured to display a text input box on a standby image on the display unit, wherein the text input box is selectively usable for at least two functions, wherein at least one of the at least two functions is a search function, and wherein the control unit is further configured to display a current function indicator for a current function of the text input box and a category indicator for a search category when the current function is the search function, together with the text input box.

In another aspect of the present invention, a computer program product and method of controlling a mobile terminal includes displaying a text input box on a standby image on a display unit, and imparting at least two functions to the text input box, wherein at least one of the at least two functions is a search function and wherein when the current function is the search function, a current function indicator for a current function of the text input box and a category indicator for a search category are displayed together with the text input box.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a pair of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or like parts.

In the following description, suffixes 'module', 'unit' and 'part' for elements are given to facilitate the preparation of this disclosure only. So, significant meanings or roles are not given to the suffixes themselves. Hence, it is understood that the 'module', 'unit' and 'part' can be used together.

Figure 1:
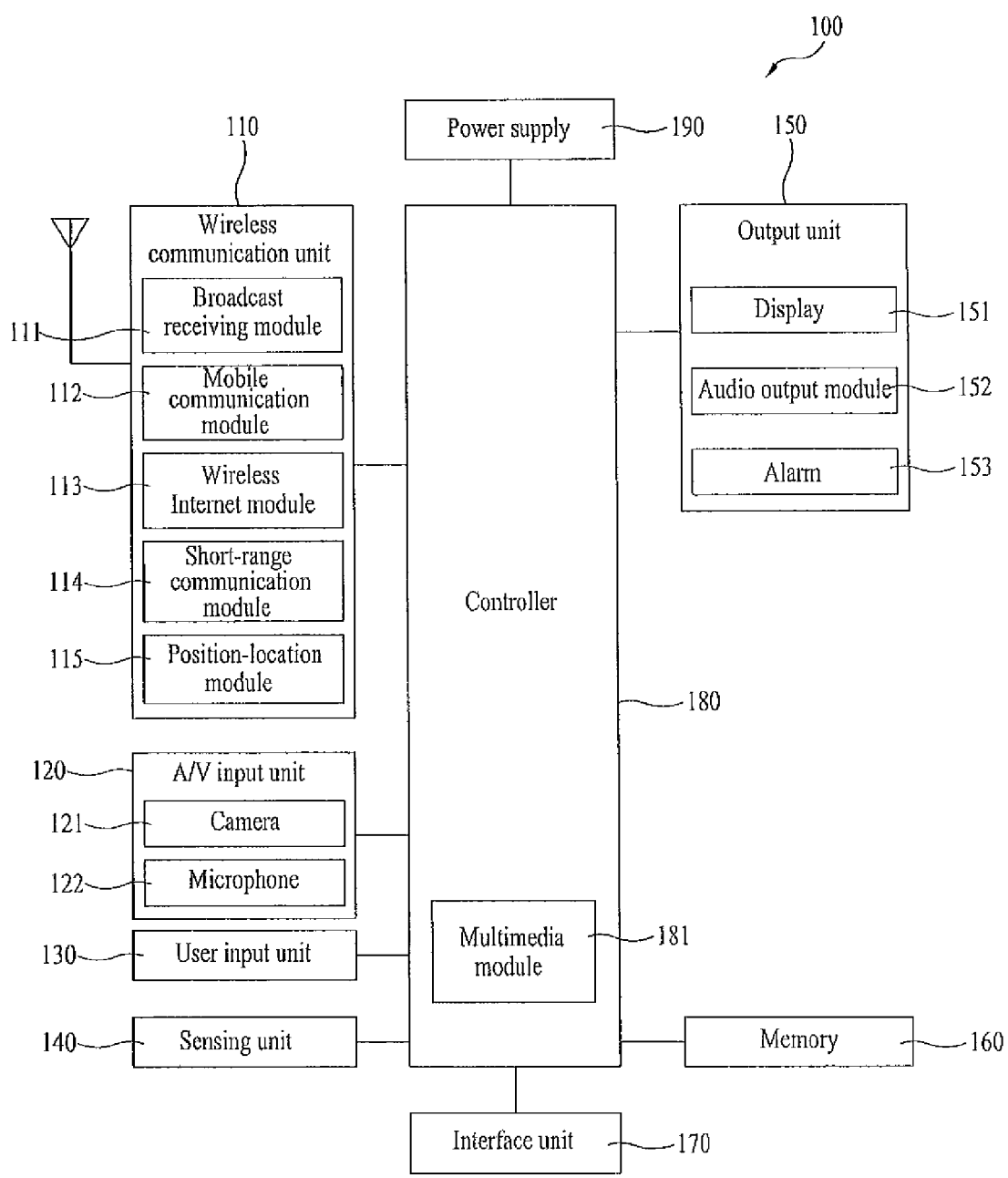
FIG. 1 is a block diagram of a mobile terminal in accordance with an embodiment of the present invention.

The terminal of the present invention may be implemented according to a variety of types. Examples of such terminals include mobile as well as non-mobile terminals, such as mobile phones, user equipment, smart phones, computers, digital broadcast terminals, personal digital assistants, portable multimedia players (PMP) and navigators. By way of non-limiting example only, further description will be with regard to a mobile terminal. However, such teachings apply equally to other types of terminals. FIG. 1 shows the mobile terminal 100 having various components, but it is understood that implementing all of the illustrated components is not a requirement. Greater or fewer components may alternatively be implemented.

FIG. 1 shows a wireless communication unit 110 configured with several commonly implemented components. For instance, the wireless communication unit 110 may include one or more components which permits wireless communication between the mobile terminal 100 and a wireless communication system or network within which the mobile terminal is located.

The broadcast receiving module 111 receives a broadcast signal and/or broadcast associated information from an external broadcast managing entity via a broadcast channel. The broadcast channel may include a satellite channel and a terrestrial channel. The broadcast managing entity refers generally to a system which transmits a broadcast signal and/or broadcast associated information. Examples of broadcast associated information include information associated with a broadcast channel, a broadcast program, a broadcast service provider, etc. For instance, broadcast associated information may include an electronic program guide (EPG) of digital multimedia broadcasting (DMB) and electronic service guide (ESG) of digital video broadcast-handheld (DVB-H).

The broadcast signal may be implemented as a TV broadcast signal, a radio broadcast signal, and a data broadcast signal, among others. If desired, the broadcast signal may further include a broadcast signal combined with a TV or radio broadcast signal.

The broadcast receiving module 111 may be configured to receive broadcast signals transmitted from various types of broadcast systems. By nonlimiting example, such broadcasting systems include digital multimedia broadcasting-terrestrial (DMB-T), digital multimedia broadcasting-satellite (DMB-S), digital video broadcast-handheld (DVB-H), the data broadcasting system known as media forward link only (MediaFLO®) and integrated services digital broadcast-terrestrial (ISDB-T). Receiving of multicast signals is also possible. If desired, data received by the broadcast receiving module 111 may be stored in a suitable device, such as memory 160.

The mobile communication module 112 transmits/receives wireless signals to/from one or more network entities (e.g., base station, Node-B). Such signals may represent audio, video, multimedia, control signaling, and data, among others.

The wireless internet module 113 supports Internet access for the mobile terminal. This module may be internally or externally coupled to the terminal. Suitable technologies for wireless Internet may include, but are not limited to, WLAN (Wireless LAN) (Wi-Fi), Wibro (Wireless broadband), Wimax (World Interoperability for Microwave Access), HSDPA (High Speed Downlink Packet Access).

The short-range communication module 114 facilitates relatively short-range communications. Suitable technologies for short-range communication my include, but are not limited to, radio frequency identification (RFID), infrared data association (IrDA), ultra-wideband (UWB), as well at the networking technologies commonly referred to as Bluetooth and ZigBee, to name a few.

Position-location module 115 identifies or otherwise obtains the location of the mobile terminal. If desired, this module may be implemented using global positioning system (OPS) components which cooperate with associated satellites, network components, and combinations thereof.

Audio/video (A/V) input unit 120 is configured to provide audio or video signal input to the mobile terminal. As shown, the A/V input unit 120 includes a camera 121 and a microphone 122. The camera receives and processes image frames of still pictures or video.

The microphone 122 receives an external audio signal while the portable device is in a particular mode, such as phone call mode, recording mode and voice recognition. This audio signal is processed and converted into digital data. The portable device, and in particular, A/V input unit 120, typically includes assorted noise removing algorithms to remove noise generated in the course of receiving the external audio signal. Data generated by the A/V input unit 120 may be stored in memory 160, utilized by output unit 150, or transmitted via one or more modules of communication unit 110. If desired, two or more microphones and/or cameras may be used.

The user input unit 130 generates input data responsive to user manipulation of an associated input device or devices. Examples of such devices include a keypad, a dome switch, a touchpad (e.g., static pressure/capacitance), a jog wheel and a jog switch. A specific example is one in which the user input unit 130 is configured as a touchpad in cooperation with a touchscreen display (which will be described in more detail below).

The sensing unit 140 provides status measurements of various aspects of the mobile terminal. For instance, the sensing unit may detect an open/close status of the mobile terminal, relative positioning of components (e.g., a display and keypad) of the mobile terminal, a change of position of the mobile terminal or a component of the mobile terminal, a presence or absence of user contact with the mobile terminal, orientation or acceleration/deceleration of the mobile terminal. As an example, consider the mobile terminal 100 being configured as a slide-type mobile terminal. In this configuration, the sensing unit 140 may sense whether a sliding portion of the mobile terminal is open or closed. Other examples include the sensing unit 140 sensing the presence or absence of power provided by the power supply 190, the presence or absence of a coupling or other connection between the interface unit 170 and an external device.

The interface unit 170 is often implemented to couple the mobile terminal with external devices. Typical external devices include wired/wireless headphones, external chargers, power supplies, storage devices configured to store data (e.g., audio, video, pictures, etc.), earphones, and microphones, among others. The interface unit 170 may be configured using a wired/wireless data port, a card socket (e.g., for coupling to a memory card, subscriber identity module (SIM) card, user identity module (UIM) card, removable user identity module (RUIM) card), audio input/output ports and video input/output ports.

The output unit 150 generally includes various components which support the output requirements of the mobile terminal. Display 151 is typically implemented to visually display information associated with the mobile terminal 100. For instance, if the mobile terminal is operating in a phone call mode, the display will generally provide a user interface or graphical user interface which includes information associated with placing, conducting, and terminating a phone call. As another example, if the mobile terminal 100 is in a video call mode or a photographing mode, the display 151 may additionally or alternatively display images which are associated with these modes.

One particular implementation includes the display 151 configured as a touch screen working in cooperation with an input device, such as a touchpad. This configuration permits the display to function both as an output device and an input device.

The display 151 may be implemented using known display technologies including, for example, a liquid crystal display (LCD), a thin film transistor-liquid crystal display (TFT-LCD), an organic light-emitting diode display (OLED), a flexible display and a three-dimensional display. The mobile terminal may include one or more of such displays. An example of a two-display embodiment is one in which one display is configured as an internal display (viewable when the terminal is in an opened position) and a second display configured as an external display (viewable in both the open and closed positions).

FIG. 1 further shows output unit 150 having an audio output module 152 which supports the audio output requirements of the mobile terminal 100. The audio output module is often implemented using one or more speakers, buzzers, other audio producing devices, and combinations thereof. The audio output module functions in various modes including call-receiving mode, call-placing mode, recording mode, voice recognition mode and broadcast reception mode. During operation, the audio output module 152 outputs audio relating to a particular function (e.g., call received, message received, and errors).

The output unit 150 is further shown having an alarm 153, which is commonly used to signal or otherwise identify the occurrence of a particular event associated with the mobile terminal. Typical events include call received, message received and user input received. An example of such output includes the providing of tactile sensations (e.g., vibration) to a user. For instance, the alarm 153 may be configured to vibrate responsive to the mobile terminal receiving a call or message. As another example, vibration is provided by alarm 153 responsive to receiving user input at the mobile terminal, thus providing a tactile feedback mechanism. It is understood that the various output provided by the components of output unit 150 may be separately performed, or such output may be performed using any combination of such components.

The memory 160 is generally used to store various types of data to support the processing, control, and storage requirements of the mobile terminal. Examples of such data include program instructions for applications operating on the mobile terminal, contact data, phonebook data, messages, pictures, video, etc. The memory 160 shown in FIG. 1 may be implemented using any type (or combination) of suitable volatile and non-volatile memory or storage devices including random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, card-type memory, or other similar memory or data storage device.

The controller 180 typically controls the overall operations of the mobile terminal. For instance, the controller performs the control and processing associated with voice calls, data communications, instant message communication, video calls, camera operations and recording operations. If desired, the controller may include a multimedia module 181 which provides multimedia playback. The multimedia module may be configured as part of the controller 180, or this module may be implemented as a separate component.

The power supply 190 provides power required by the various components for the portable device. The provided power may be internal power, external power, or combinations thereof.

Various embodiments described herein may be implemented in a computer-readable medium using, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. In some cases, such embodiments are implemented by controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory (for example, memory 160), and executed by a controller or processor (for example, controller 180).

Mobile terminal 100 may be implemented in a variety of different configurations. Examples of such configurations include folder-type, slide-type, bar-type, rotational-type, swing-type and combinations thereof. For clarity, further disclosure will primarily relate to a slide-type mobile terminal. However such teachings apply equally to other types of terminals.

Figure 2:
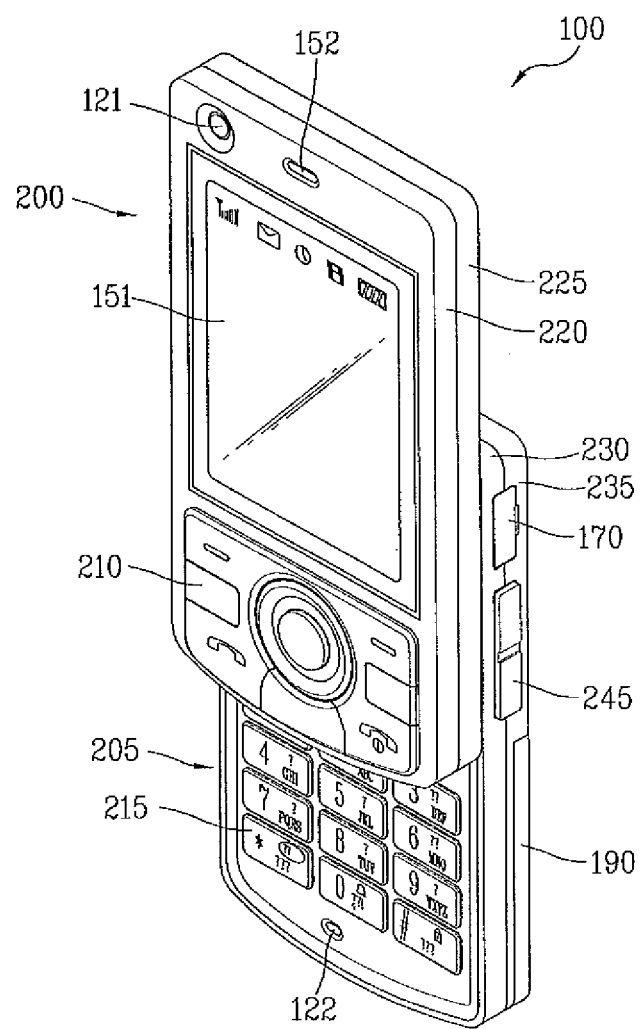
FIG. 2 is a perspective view of a front side of a mobile terminal according to an embodiment of the present invention.

FIG. 2 is a perspective view of a front side of a mobile terminal according to an embodiment of the present invention. In FIG. 2, the mobile terminal 100 is shown having a first body 200 configured to slideably cooperate with a second body 205. The user input unit (described in FIG. 1) may include a first input unit such as the touchpad and function keys 210, a second input unit such as keypad 215 and a third input unit such as side keys 245. The function keys 210 are associated with first body 200, and the keypad 215 is associated with second body 205. The keypad includes various keys (e.g., numbers, characters, and symbols) to enable a user to place a call, prepare a text or multimedia message, and otherwise operate the mobile terminal.

The first body 200 slides relative to second body 205 between open and closed positions. In a closed position, the first body is positioned over the second body in such a manner that the keypad 215 is substantially or completely obscured by the first body 200. In the open position, user access to the keypad 215, as well as the display 151 and function keys 210, is possible. The function keys are convenient to a user for entering commands such as start, stop and scroll.

The mobile terminal 100 is operable in either a standby mode (e.g., able to receive a call or message, receive and respond to network control signaling), or an active call mode. Typically, the mobile terminal 100 functions in a standby mode when in the closed position, and an active mode when in the open position. This mode configuration may be changed as required or desired.

The first body 200 is shown formed from a first case 220 and a second case 225, and the second body 205 is shown formed from a first case 230 and a second case 235. The first and second cases are usually formed from a suitably ridge material such as injection molded plastic, or formed using metallic material such as stainless steel (STS) and titanium (Ti).

If desired, one or more intermediate cases may be provided between the first and second cases of one or both of the first and second bodies 200, 205. The first and second bodies 200, 205 are typically sized to receive electronic components necessary to support operation of the mobile terminal 100.

The first body 200 is shown having a camera 121 and audio output unit 152, which is configured as a speaker, positioned relative to the display 151. If desired, the camera 121 may be constructed in such a manner that it can be selectively positioned (e.g., rotated, swiveled, etc.) relative to first body 200.

The function keys 210 are positioned adjacent to a lower side of the display 151. The display 151 is shown implemented as an LCD or OLED. Recall that the display may also be configured as a touchscreen having an underlying touchpad which generates signals responsive to user contact (e.g., finger, stylus, etc.) with the touchscreen.

Second body 205 is shown having a microphone 122 positioned adjacent to keypad 215, and side keys 245, which are one type of a user input unit, positioned along the side of second body 205. Preferably, the side keys 245 may be configured as hot keys, such that the side keys are associated with a particular function of the mobile terminal. An interface unit 170 is shown positioned adjacent to the side keys 245, and a power supply 190 in a form of a battery is located on a lower portion of the second body 205.

Figure 3:
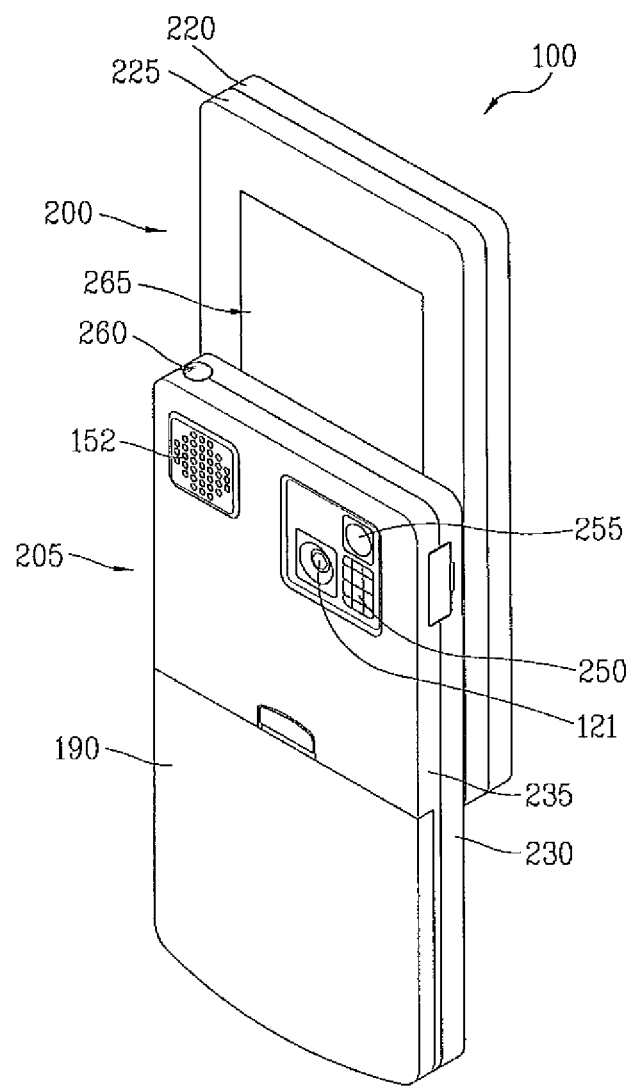
FIG. 3 is a rear view of the mobile terminal shown in FIG. 2.

FIG. 3 is a rear view of the mobile terminal shown in FIG. 2. FIG. 3 shows the second body 205 having a camera 121, and an associated flash 250 and mirror 255. The flash operates in conjunction with the camera 121 of the second body. The mirror 255 is useful for assisting a user to position camera 121 in a self-portrait mode. The camera 121 of the second body faces a direction which is opposite to a direction faced by camera 121 of the first body 200 (FIG. 2). Each of the cameras 121 of the first and second bodies may have the same or different capabilities.

In an embodiment, the camera of the first body 200 operates with a relatively lower resolution than the camera of the second body 205. Such an arrangement works well during a video conference, for example, in which reverse link bandwidth capabilities may be limited. The relatively higher resolution of the camera of the second body 205 (FIG. 3) is useful for obtaining higher quality pictures for later use or for communicating to others.

The second body 205 also includes all audio output module 152 configured as a speaker, and which is located on an upper side of the second body. If desired, the audio output modules of the first and second bodies 200, 205, may cooperate to provide stereo output. Moreover, either or both of these audio output modules may be configured to operate as a speakerphone.

A broadcast signal receiving antenna 260 is shown located at an upper end of the second body 205. Antenna 260 functions in cooperation with the broadcast receiving module 111 (FIG. 1). If desired, the antenna 260 may be fixed or configured to retract into the second body 205. The rear side of the first body 200 includes slide module 265, which slideably couples with a corresponding slide module located on the front side of the second body 205.

It is understood that the illustrated arrangement of the various components of the first and second bodies 200, 205, may be modified as required or desired. In general, some or all of the components of one body may alternatively be implemented on the other body. In addition, the location and relative positioning of such components are not critical to many embodiments, and as such, the components may be positioned at locations which differ from those shown by the representative figures.

The mobile terminal 100 of FIGS. 1-3 may be configured to operate within a communication system which transmits data via frames or packets, including both wireless and wireline communication systems, and satellite-based communication systems. Such communication systems utilize different air interfaces and/or physical layers.

Examples of such air interfaces utilized by the communication systems include example, frequency division multiple access (FDMA), time division multiple access (TDMA), code division multiple access (CDMA), and universal mobile telecommunications system (UMTS), the long term evolution (LTE) of the UMTS, and the global system for mobile communications (GSM). By way of non-limiting example only, further description will relate to a CDMA communication system, but such teachings apply equally to other system types.

Figure 4:
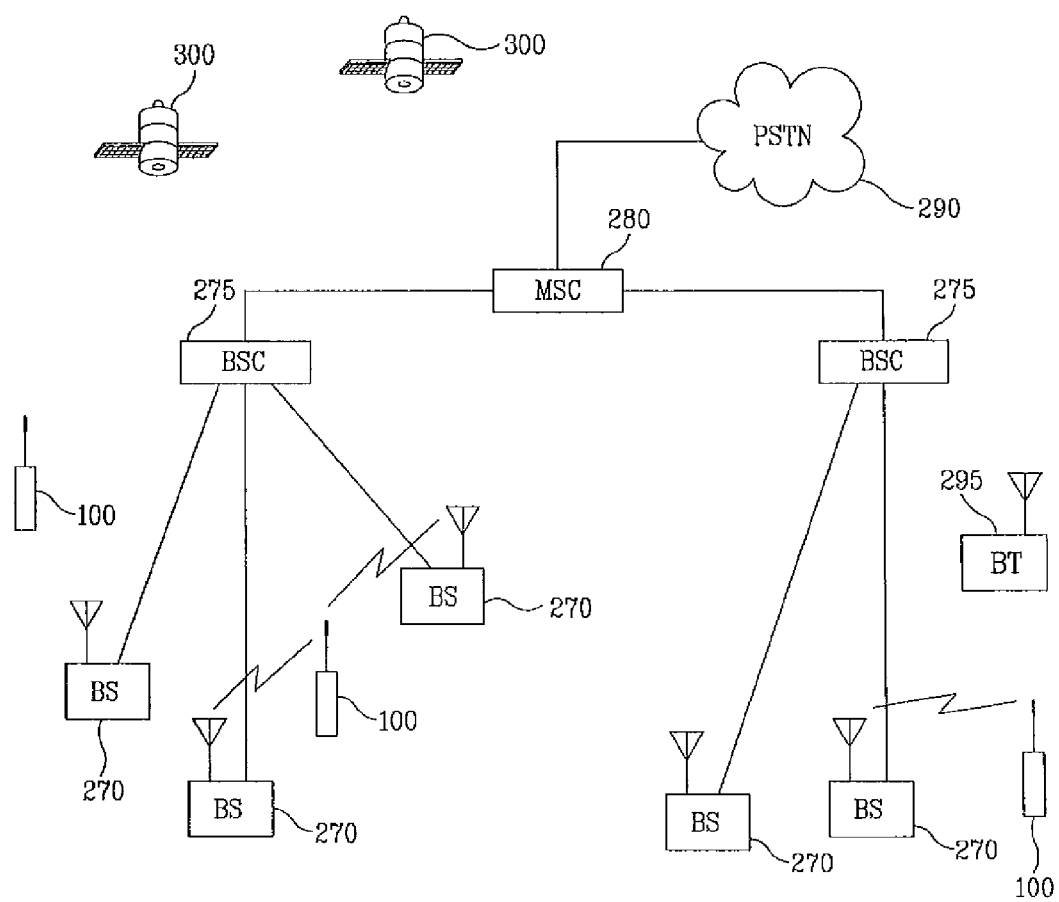
FIG. 4 is a block diagram of a CDMA wireless communication system operable with the mobile terminal of FIGS. 1 to 3.

Referring now to FIG. 4, a CDMA wireless communication system is shown having a plurality of mobile terminals 100, a plurality of base stations 270, base station controllers (BSCs) 275, and a mobile switching center (MSC) 280. The MSC 280 is configured to interface with a conventional public switch telephone network (PSTN) 290. The MSC 280 is also configured to interface with the BSCs 275. The BSCs 275 are coupled to the base stations 270 via backhaul lines. The backhaul lines may be configured in accordance with any of several known interfaces including, for example, E1/T1, ATM, IP, PPP, Frame Relay, HDSL, ADSL, or xDSL. It is to be understood that the system may include more than two BSCs 275.

Each base station 270 may include one or more sectors, each sector having an omnidirectional antenna or an antenna pointed in a particular direction radially away from the base station 270. Alternatively, each sector may include two antennas for diversity reception. Each base station 270 may be configured to support a plurality of frequency assignments, with each frequency assignment having a particular spectrum (e.g., 1.25 MHz, 5 MHz).

The intersection of a sector and frequency assignment may be referred to as a CDMA channel. The base stations 270 may also be referred to as base station transceiver subsystems (BTSs). In some cases, the term "base station" may be used to refer collectively to a BSC 275, and one or more base stations 270. The base stations may also be denoted "cell sites." Alternatively, individual sectors of a given base station 270 may be referred to as cell sites.

A terrestrial digital multimedia broadcasting (DMB) transmitter 295 is shown broadcasting to portable terminals 100 operating within the system. The broadcast receiving module 111 (FIG. 1) of the portable terminal is typically configured to receive broadcast signals transmitted by the DMB transmitter 295. Similar arrangements may be implemented for other types of broadcast and multicast signaling (as discussed above).

FIG. 4 further depicts several global positioning system (GPS) satellites 300. Such satellites facilitate locating the position of some or all of the portable terminals 100. Two satellites are depicted, but it is understood that useful positioning information may be obtained with greater or fewer satellites. The position-location module 115 (FIG. 1) of the portable terminal 100 is typically configured to cooperate with the satellites 300 to obtain desired position information. It is to be appreciated that other types of position detection technology, (i.e., location technology that may be used in addition to or instead of GPS location technology) may alternatively or be implemented. If desired, some or all of the GPS satellites 300 may alternatively or additionally be configured to provide satellite DMB transmissions.

During typical operation of the wireless communication system, the base stations 270 receive sets of reverse-link signals from various mobile terminals 100. The mobile terminals 100 are engaging in calls, messaging, and other communications. Each reverse-link signal received by a given base station 270 is processed within that base station. The resulting data is forwarded to an associated BSC 275. The BSC provides call resource allocation and mobility management functionality including the orchestration of soft handoffs between base stations 270. The BSCs 275 also route the received data to the MSC 280, which provides additional routing services for interfacing with the PSTN 290. Similarly, the PSTN interfaces with the MSC 280, and the MSC interfaces with the BSCs 275, which in turn control the base stations 270 to transmit sets of forward-link signals to the mobile terminals 100.

In the following description, a controlling method implemented in the above-configured will be explained per an embodiment. It is to be understood that each of the following embodiments can be implemented independently or that the present invention may be performed using any combination of such embodiments.

In the following description, it is assumed that the mobile terminal includes the slider type terminal including the first and second bodies. In particular, the first body 200 is a main body and the second body 205 is a slider that slides on the main body. And, it is also to be understood that the present invention is applicable to but not limited to a folder type terminal, a swing type terminal and the like as well as the slider type terminal.

FIRST EMBODIMENT

A method of controlling a mobile terminal according to a first embodiment of the present invention is explained with reference to FIG. 5 and FIG. 6 as follows.

Figure 5:
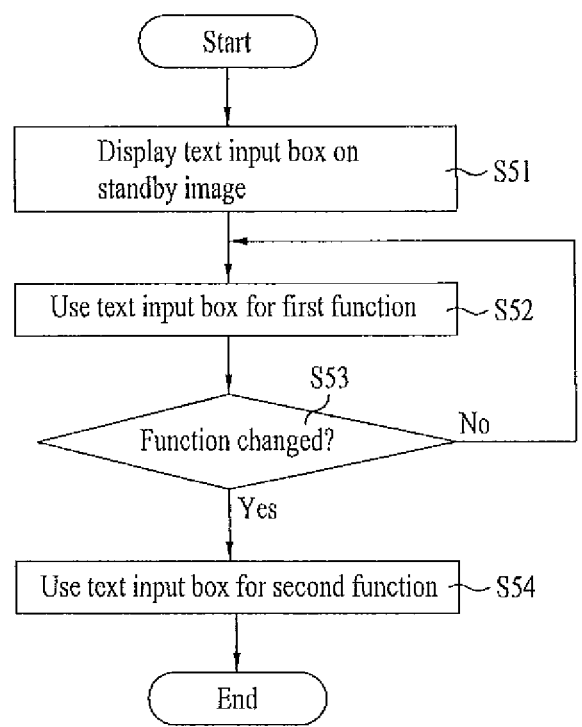
FIG. 5 is a flowchart for a method of controlling a mobile terminal according to a first embodiment of the present invention.
Figure 6:
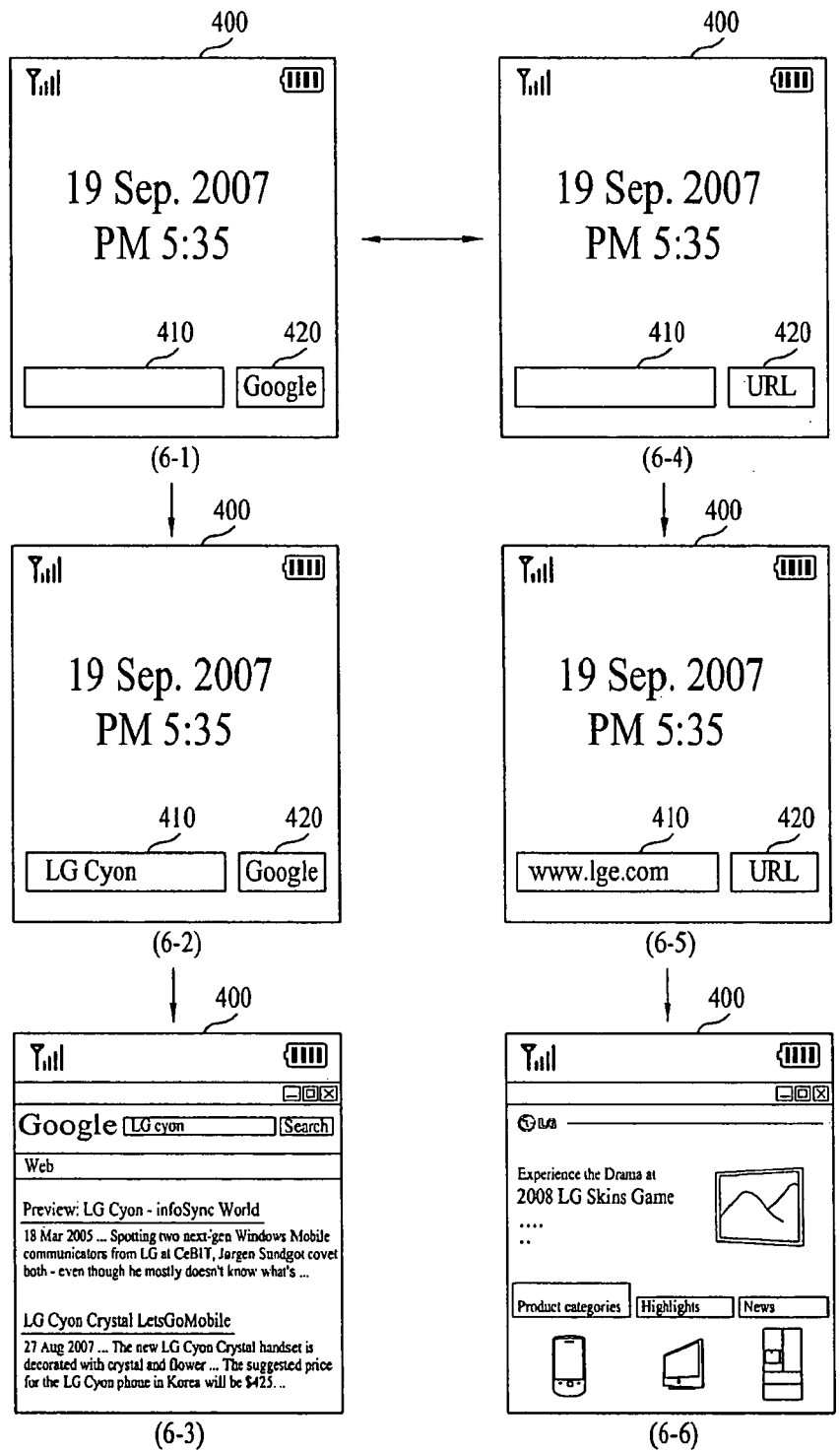
FIG. 6 is a diagram of a display screen on which a method of controlling a mobile terminal according to a first embodiment of the present invention is implemented.

FIG. 5 is a flowchart for a method of controlling a mobile terminal according to a first embodiment of the present invention, and FIG. 6 is a diagram of a display screen on which a method of controlling a mobile terminal according to a first embodiment of the present invention is implemented.

Referring to (6-1) of FIG. 6, a standby image is displayed on a touchscreen 400 of the mobile terminal 100. And, a text input box 410 is displayed on the standby image [S51].

In the present embodiment, the text input box 410 is usable for at least two functions including a first function and a second function. Details of the first and second functions are described below.

An indicator 420, indicating which one of the first and second functions is used for the text input box 410, is displayed on the standby image [S52].

In an aspect where the display module 151 of the mobile terminal 100 does not include a touchscreen, the first and second functions, as shown in (6-1) and (6-2) of FIG. 6, may be selected or switched via a corresponding key manipulation (e.g., soft key manipulation) of the user input unit [S53, S54].

In an aspect where the display module 151 of the mobile terminal 100 is configured to operate as a touchscreen in a manner of constructing a mutual layer structure with the touchpad, the first and second functions, as shown in (6-1) and (6-4) of FIG. 6, may be controlled to be mutually switched to each other by having the indicator 420 touched (e.g., long touch). In this case, the indicator 420 is able to play a role as a toggle switch type selector to select either the first function or the second function [S53, S54].

In the following description, it is assumed that the display module 151 operates as a touchscreen.

In (6-1) of FIG. 6, depicted is an example that the text input box 410 is in progress of the first function, e.g., a search function such as a GOOGLE search function. The first function may be another search function such as YAHOO or the like.

For the search function, a terminal user selects the text input box 410, for example by touching the text input box 410.

Subsequently, a prescribed search word, as shown in (6-2) of FIG. 6, is inputted to the text input box 410 via the user input unit 130. It can be considered that when the text input box 410 is selected, a virtual keypad is created on the touchscreen, and the search word is inputted via the created virtual keypad.

After the search word has been inputted, if a command for executing a search for the search word is inputted, a result of the search corresponding to the search word, as shown in (6-3) of FIG. 6, is displayed.

The execution command for the search can be carried out by a corresponding key manipulation (e.g., soft key manipulation) of the user input unit or by a touch of the indicator (e.g., via a short touch).

Meanwhile, an example of attempting to use the text input box 410 for the second function, e.g., an internet address input function (e.g., internet URL (uniform resource locator) input unction) is explained as follows.

On the touchscreen 400 shown in (6-1) of FIG. 6, a terminal user makes a long touch to the indicator 420. If so, the text input box is switched for the second function. The indicator 420, as shown in (6-4) of FIG. 6, indicates that the text input box 410 is usable for the internet URL input function.

Subsequently, a prescribed internet URL, as shown in (6-5) of FIG. 6, is inputted to the text input box 410 via the user input unit 130. It can be considered that when the text input box 410 is selected, a virtual keypad is created on the touchscreen, and the internet URL is inputted via the created virtual keypad.

After completion of the internet URL input, if a command for executing an entry to the internet URL is inputted, a webpage, as shown in (6-6) of FIG. 6, corresponding to the internet URL is displayed.

The command for the entry to the internet URL can be carried out via a corresponding key manipulation (e.g., soft key manipulation) of the user input unit 130 or a touch (e.g., short touch) of the indicator 420.

The above-explained first and second functions are not limited to the search function and the Internet URL input function, respectively. For the first and second functions, two functions can be selected from the group consisting of a first preset website search function, a second preset website search function, an internet address input function, a calculator function, and a file search function within a terminal. Other functions include an image retrieval function, a web upload function, a database search function, an address book function, a calendar function, or other functions. The first and second function may be set by the manufacturer, distributor or user. When the first and second functions are different search functions (e.g., YAHOO and GOOGLE), a user can search for the same term via alternative search programs. In one aspect, the search term is preserved when switching between the search functions. In another aspect, the search term is not preserved.

SECOND EMBODIMENT

A method of controlling a mobile terminal according to a second embodiment of the present invention is explained with reference to FIG. 7 and FIG. 8 as follows.

Figure 7:
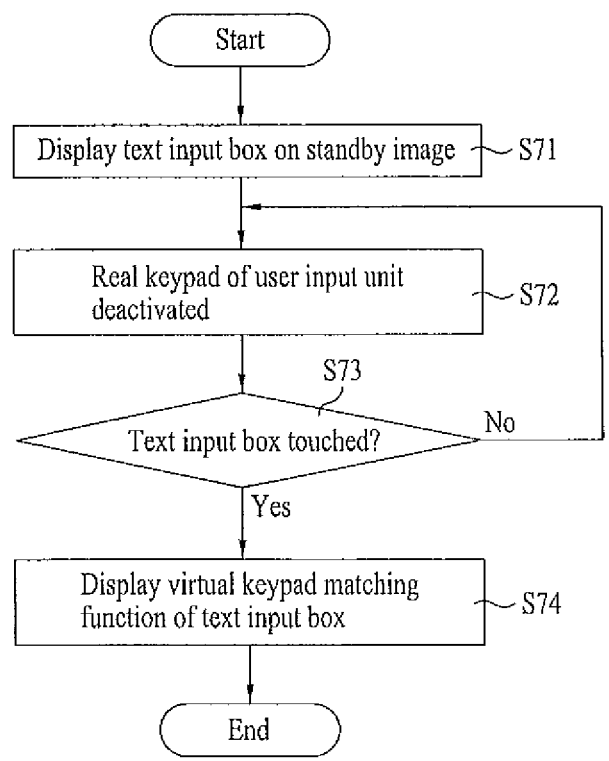
FIG. 7 is a flowchart for a method of controlling a mobile terminal according to a second embodiment of the present invention.
Figure 8:
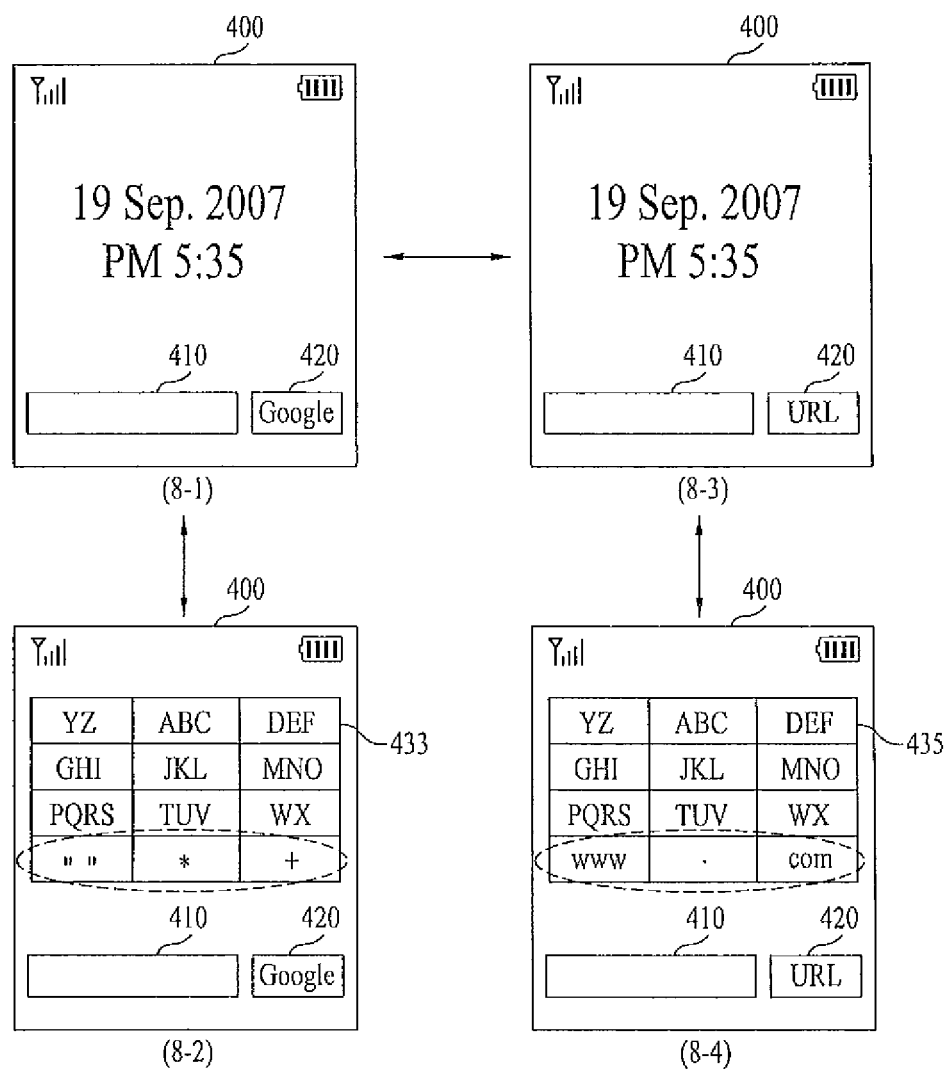
FIG. 8 is a diagram of a display screen on which a method of controlling a mobile terminal according to a second embodiment of the present invention is implemented.

FIG. 7 is a flowchart for a method of controlling a mobile terminal according to a second embodiment of the present invention, and FIG. 8 is a diagram of a display screen on which a method of controlling a mobile terminal according to a second embodiment of the present invention is implemented.

Referring to (8-1) of FIG. 8, a text input box 410 for a search function is presented in a standby image displayed on the touchscreen 400 [S71]. And, all indicator 420, indicating that the text input box 410 is used for searching, is displayed together with the text input box 410.

While the mobile terminal 100 is in a closed position, a real keypad for a text input of the user input unit 130 is not externally exposed. So, the real keypad may be in a deactivated mode [S72].

If the text input box 410 is selected, a virtual keypad 433, as shown in (8-2) of FIG. 8, is created on the touchscreen [S73, S74]. Hence, a terminal user is able to input a search word via the created virtual keypad.

Optionally, the created virtual keypad may be controlled to automatically disappear from the touchscreen if the real keypad of the user input unit is in an active mode (e.g., the real keypad is externally exposed since the mobile terminal is in an open position).

Referring to (8-3) of FIG. 8, the text input box 410 for an internet address input function is presented on a standby image displayed on the touchscreen 400. And, an indicator 420 indicating that the text input box 410 is used for the internet address input function is displayed together with the text input box 410.

If the text input box 410 is selected and the real keypad, as shown in (8-4) of FIG. 8, becomes deactivated, a virtual keypad 435 is created on the touchscreen 400. This is quite similar to the example shown in (8-2) of FIG. 8.

Yet, the virtual keypad 435 shown in (8-4) of FIG. 8 needs not to be identical to the former virtual keypad 435 shown in (8-2) of FIG. 8. Namely, the created virtual keypads may be controlled to differ at least in part from each other to be most suitable for each of the functions used for the text input box, respectively.

For instance, the virtual keypad 435 shown in (8-4) of FIG. 8 can be provided with such a key button facilitating an internet address input as 'www', 'com' and the like. Other types of hot-keys and non-alphanumeric symbols may be included in the virtual keypads. The virtual keypads may be fixed by the manufacturer or distributor, or may be set or varied by the user. The virtual keypads may display English characters, or other characters such as Korean.

THIRD EMBODIMENT

In the first embodiment of the present invention, a single text input box is presented in the standby image and the text input box is usable for two functions. The present invention is further applicable to the scenario where the text input box is usable for at least three functions. This is explained as a third embodiment of the present invention with reference to FIG. 9.

Figure 9:
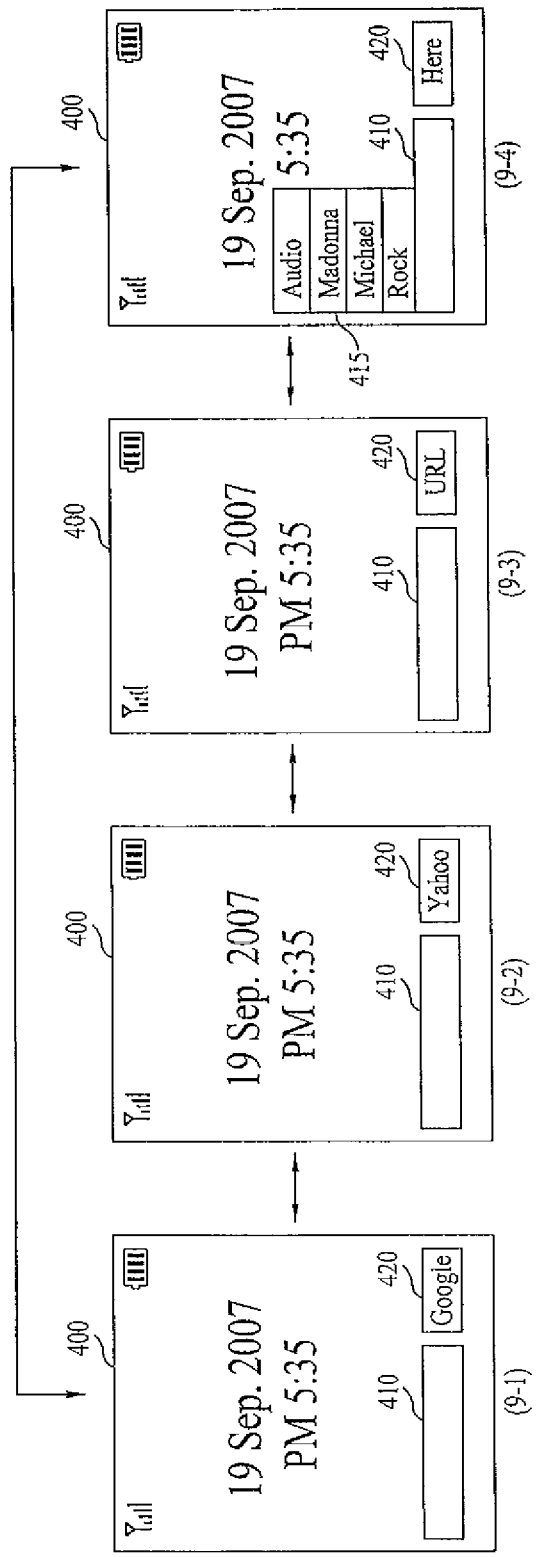
FIG. 9 is a diagram of a display screen on which a method of controlling a mobile terminal according to a third embodiment of the present invention is implemented.

FIG. 9 is a diagram of a display screen on which a method of controlling a mobile terminal according to a third embodiment of the present invention is implemented.

Referring to (9-1) of FIG. 9, a text input box 410 is presented in a standby image displayed on the display screen 400 of the mobile terminal 100. And, an indicator 420 indicating a function for which the text input box 410 will be used is displayed on the display screen 400 together with the text input box 410. In (9-1) of FIG. 9, the indicator 420 indicates that the text input box 410 is usable for a first function (e.g., a first preset website search function).

If a long touch is made to the indicator 420 or if a corresponding key manipulation is carried out on the user input unit 140, the indicator 420, as shown in (9-2) of FIG. 9, indicates that the text input box 410 is usable for a second function (e.g., a second preset website search function).

Similarly, whenever a long touch is made to the indicator 420 or each time a corresponding key manipulation is carried out on the user input unit 140, the indicator 420, as shown in (9-3)/(9-4) of FIG. 9, indicates that the text input box 410 is us usable for a third/fourth function. In this case, the third function may include an internet address input function and the fourth function may include a file search function within a terminal.

So, by making a long touch to the indicator 420 or performing a corresponding key manipulation on the user input unit 130 until a necessary function is assigned to the text input box 410, a terminal user is able to change a function of the text input box.

Referring to (9-4) of FIG. 9, if the text input box 410 is double touched for example it may be able to display a list 415 of texts recently inputted to the text input box 410.

And, it may able to preset the number of functions used for the text input box 410 via a menu manipulation of the mobile terminal.

FOURTH EMBODIMENT

In previous embodiments, a function to be used for the text input box 410 is changed if the indicator 420 is briefly touched. The present invention enables the function to be changed in various ways. This example is explained as a fourth embodiment of the present invention with reference to FIGS. 10 to 14.

FIGS. 10 to 14 are diagrams of a display screen on which a method of controlling a mobile terminal according to a fourth embodiment of the present invention is implemented.

Figure 10:
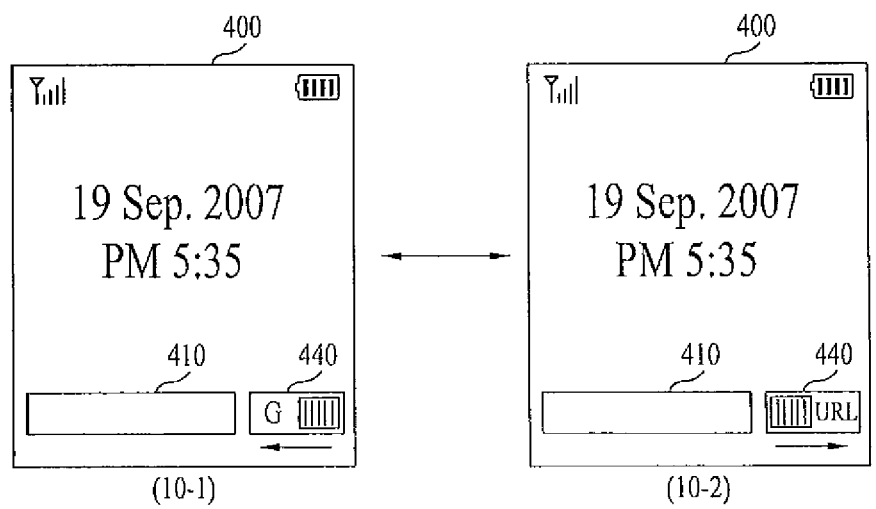
FIGS. 10 to 14 are diagrams of a display screen on which a method of controlling a mobile terminal according to a fourth embodiment of the present invention is implemented.

Like the descriptions of the first to third embodiments of the present invention, FIG. 10 shows that a text input box 410 and an indicator 440 are displayed. Yet, the indicator 440 shown in FIG. 10 is configured in a slide switch type different from the former indicator 420 of the first to third embodiments.

Referring to (10-1) of FIG. 10, the indicator 440 indicates that a function used for the text input box is a search function for example.

If a slide switch within the indicator 440 is touched and dragged left, a function for the text input box, as shown in (10-2) of FIG. 10, is changed into an internet address input function. And, the indicator 440 indicates that the text input box is usable for an internet address input.

Figure 11:
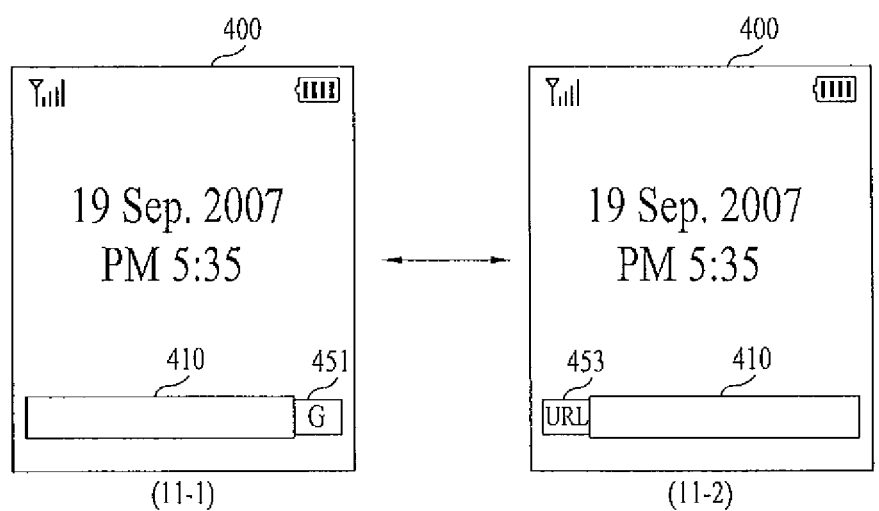

FIG. 11 shows that the text input box 410 itself is used as a slider switch.

Referring to (11-1) of FIG. 11, a portion 451 of the indicator is displayed light to the text input box 410. The portion 451 of the indicator indicates that the text input box 410 is usable in association with searching.

If the text input box 410 itself is touched and dragged right, the text input box 410, as shown in (11-2) of FIG. 11, covers the portion 451 of the indicator and moves to expose a different portion 453 of the indicator.

The different portion 453 of the exposed indicator indicates that the text input box 410 undergoes a function change to be usable in association with an internet URL input.

Figure 12:
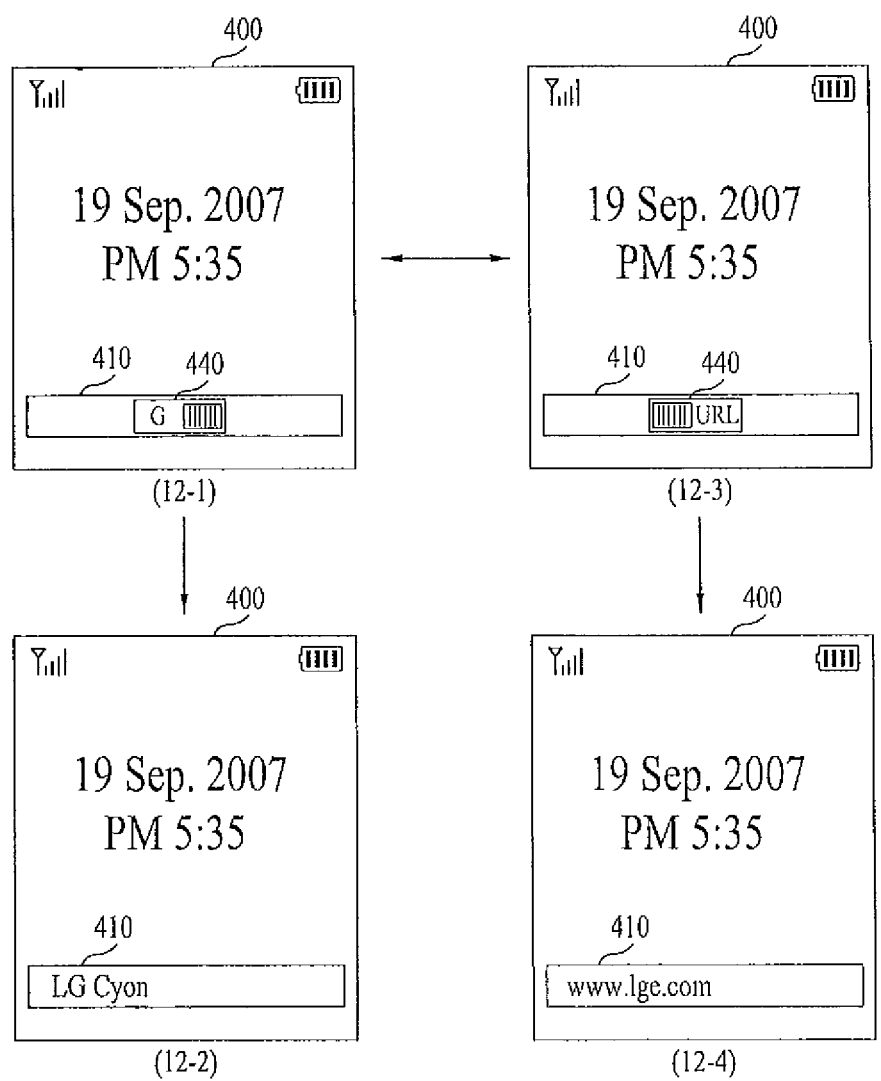

Referring to (12-1) or (12-3) of FIG. 12, the indicator 440 shown in FIG. 10 is provided within the text input box 410 shown in FIG. 10, whereby both of the indicator 440 and the text input box 410 can be built in one body. So, if a text is inputted to the text input box 410, the indicator 440, as shown in (12-2) or (12-4) of FIG. 12, may be controlled to disappear. This can be easily understood from the description of FIG. 10 without additional explanation. So, details will be omitted in the following description for clarity. Alternatively, it is able to modify the configuration in a manner that both of the indicator 440 and the text input box 410 to be built in one body by providing the indicator 440 shown in FIG. 6 within the text input box 410 shown in FIG. 6.

Figure 13:
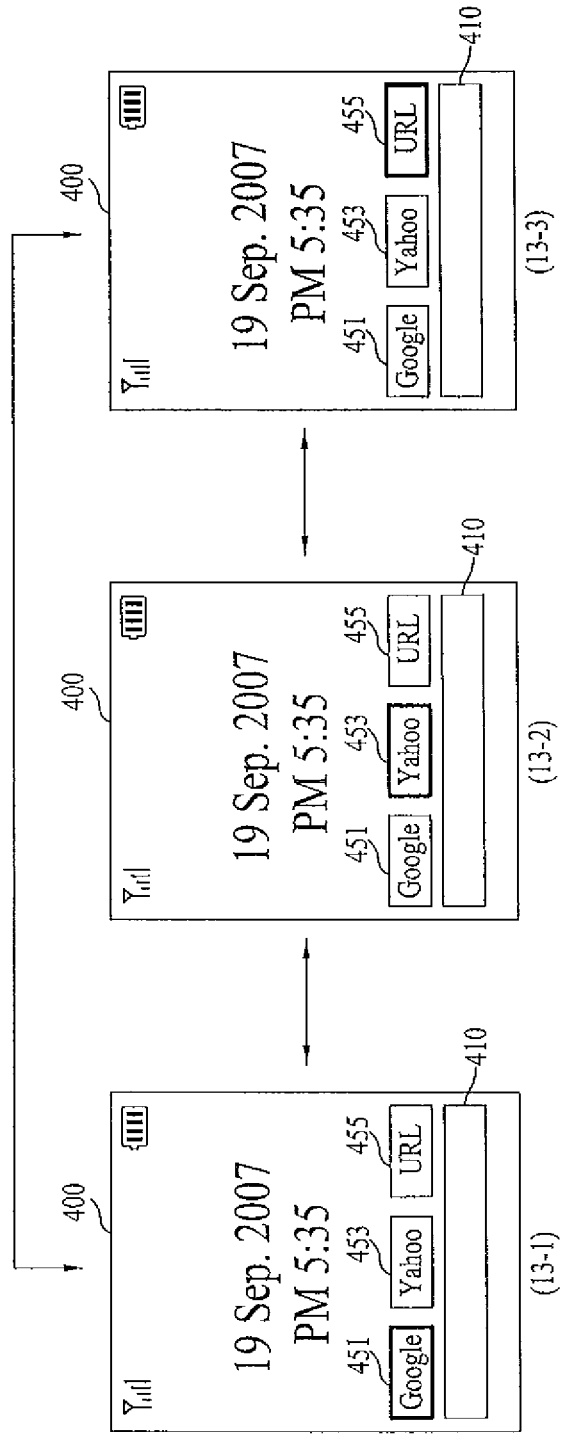

Referring to (13-1) or (13-3) of FIG. 13, a text input filed 410 and a plurality of indicators 451, 453 and 455 respectively indicating functions of the text input field are simultaneously presented in a standby image displayed on a screen. One of a plurality of the indicators is displayed to be visually discriminated from the rest of the indicators. So, a terminal is facilitated to recognize that the text input filed 410 is usable for the function corresponding to the visually discriminated indicator. The terminal user views a plurality of the indicators at a glance, thereby understanding the functions usable for the text input field intuitively.

Figure 14:
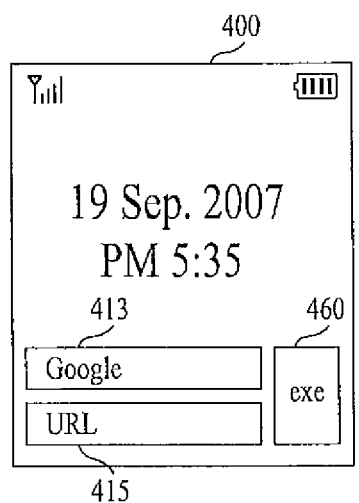

FIG. 14 shows that at least two text input boxes 413 and 415 usable for different function are presented in a standby image displayed on a screen of the mobile terminal.

Referring to FIG. 14, an execution icon 460 is provided next to the text input boxes 413 and 415 to give a command for executing the function relevant to a text inputted to the corresponding text input box 413/415.

FIFTH EMBODIMENT

In the previous embodiments, the text input box and the indicator corresponding to the text input box are presented in the standby image displayed on the screen. In addition, it is possible to further configure the present invention such that the text input box and the corresponding indicator are implemented on a web browser. This is explained as a fifth embodiment of the present invention with reference to FIG. 15.

Figure 15:
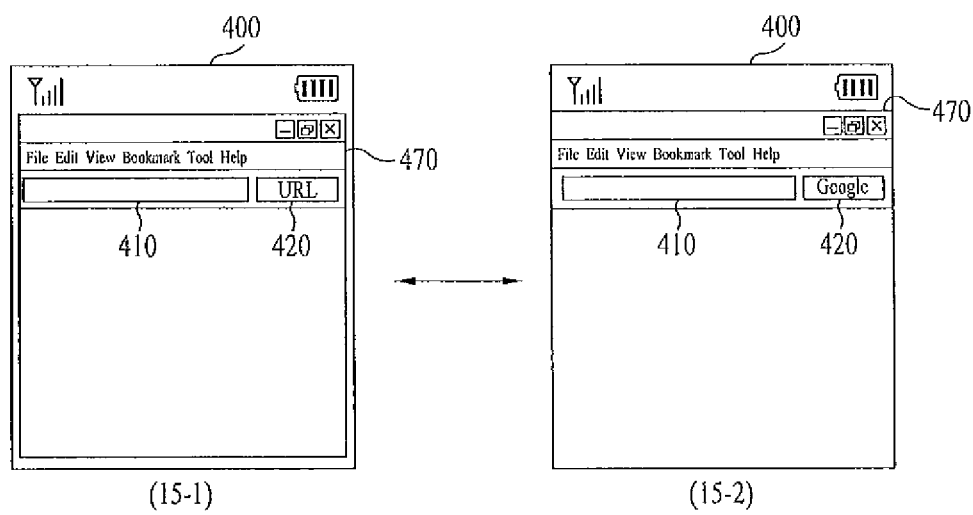
FIG. 15 is a diagram of a display screen on which a method of controlling a mobile terminal according to a fifth embodiment of the present invention is implemented.

FIG. 15 is a diagram of a display screen on which a method of controlling a mobile terminal according to a fifth embodiment of the present invention is implemented.

Referring to (15-1) of FIG. 15, a web browser for an internet access is displayed on a display screen 400 of the mobile terminal 100.

And, a text input box 410 and a corresponding indicator 420, similar to the first to fourth embodiments of the present invention, are displayed on the web browser.

Hence, a terminal user enables the web browser to display a webpage of a specific internet URL by inputting the specific internet URL to the text input box 410 in the state shown in (15-1) of FIG. 15 [cf. (6-6) of FIG. 6].

Meanwhile, the terminal user makes a long touch to the indicator 420 for example, thereby enabling the text input box, as shown in (15-2) of FIG. 15, to operate as a search text input box of a specific search engine (e.g., YAHOO, GOOGLE, etc).

Hence, if the terminal user inputs a specific search word text to the text input box shown in (15-2) of FIG. 15 regardless of what kind of webpage the web browser displays, the web browser displays a result from searching with the search word text in the specific search engine [cf. (6-3) of FIG. 6].

SIXTH EMBODIMENT

A method of controlling a mobile terminal according to a sixth embodiment of the present invention is explained with reference to FIG. 16 and FIG. 17 as follows.

Figure 16:
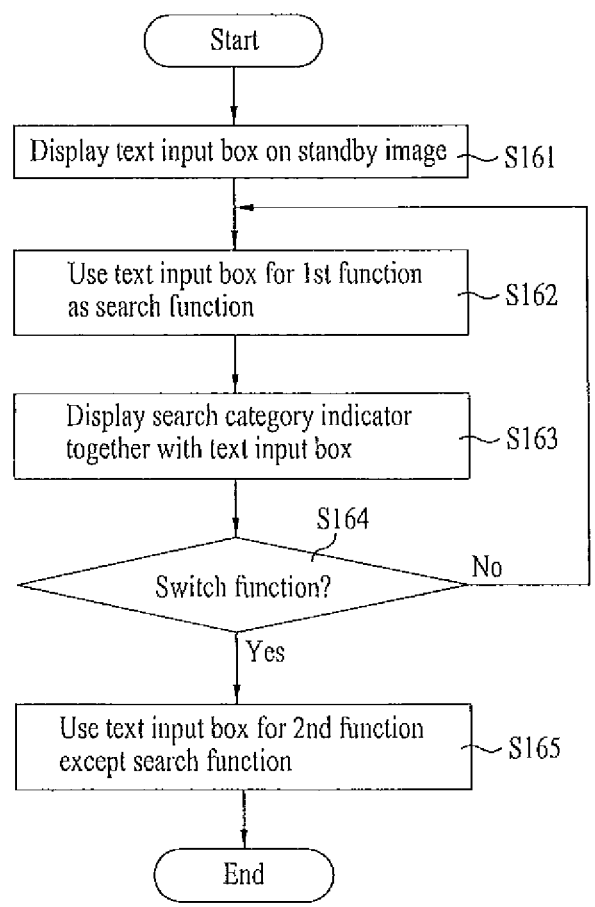
FIG. 16 is a diagram of a flowchart for a method of controlling a mobile terminal according to a sixth embodiment of the present invention.
Figure 17:
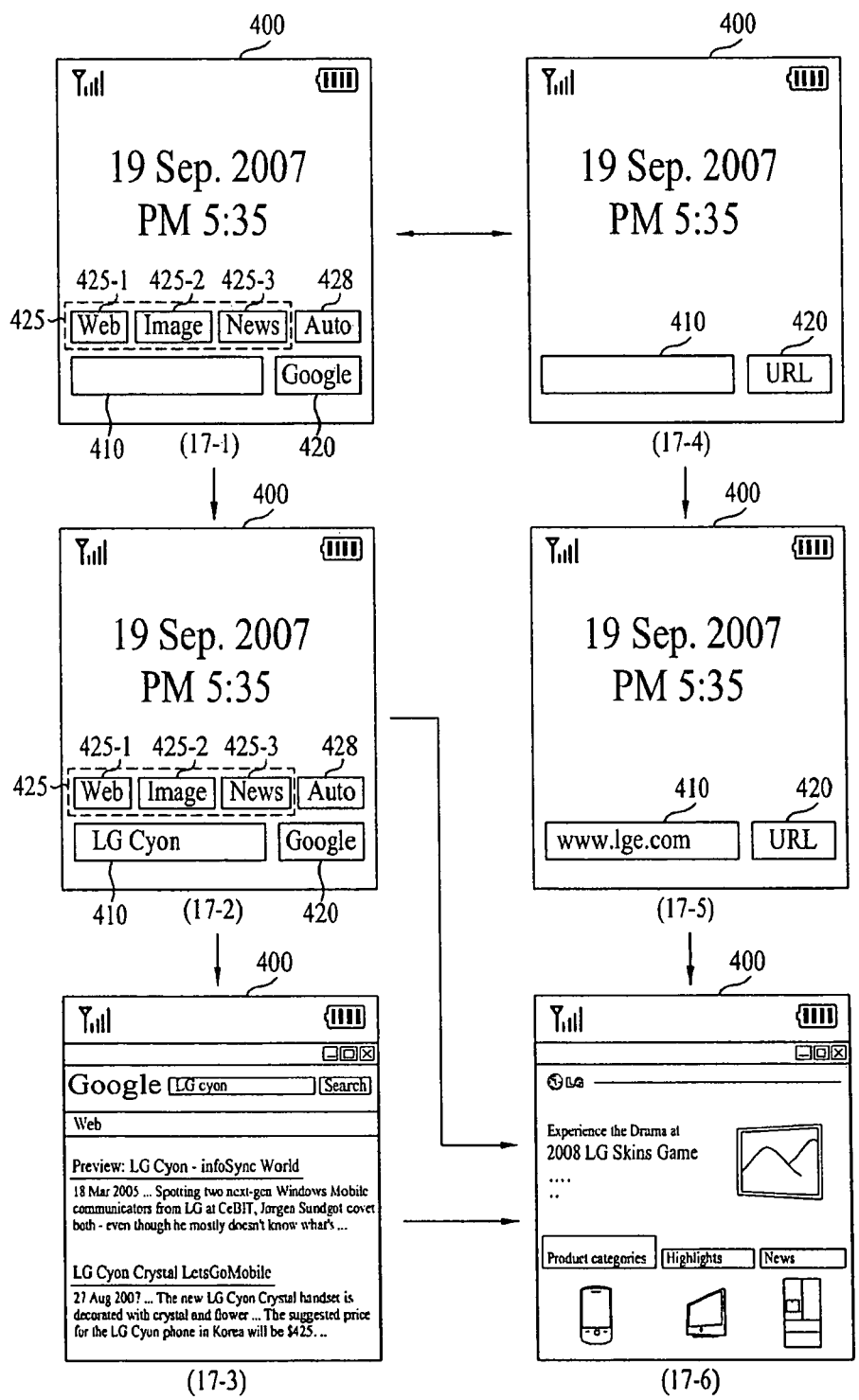
FIG. 17 is a diagram of a display screen on which a method of controlling a mobile terminal according to a sixth embodiment of the present invention is implemented.

FIG. 16 is a diagram of a flowchart for a method of controlling a mobile terminal according to a sixth embodiment of the present invention, and FIG. 17 is a diagram of a display screen on which a method of controlling a mobile terminal according to a sixth embodiment of the present invention is implemented.

Referring to (17-1) of FIG. 17, a standby image is displayed on the touchscreen 400 of the mobile terminal 100. And, a text input box 410 is displayed on the standby image [S161].

In this case, the text input box 410 can be used for at least two functions. In the present embodiment, assume that the text input box 410 is usable for first and second functions. And, the first and second functions will be described in detail later.

A function indicator 420 indicating whether the text input box 410 is used for either the first function or the second function is displayed on the standby image.

In one aspect where the display module 151 is configured in a mutual layer structure with the touchpad to operate as a touchscreen in the mobile terminal 100, the first function and the second function can be configured to switch with each other, as shown in (17-1) and (17-4) of FIG. 17, in a manner that the function indicator 420 is touched (e.g., long touched). Therefore, the function indicator 420 can play a role as a toggle switch type selector for selecting either the first function or the second function.

This description continues on the assumption that the display module 151 works as the touchscreen.

In (17-1) of FIG. 17, exemplarily shown that the text input box 410 is performing the first function which is a search function such as a YAHOO or GOOGLE search [S162].

In particular, when the text input box 410 is performing the search function, at least one or more category indicators 425 can be displayed on the touchscreen to indicate a category of the corresponding search [S163].

In this case, the categories of the search can include a webpage category, an image category, a moving picture category, a dictionary category, a news category, a blog category, and the like (by non-limiting the search categories, more categories are possible). For clarity, category indicators 425-1, 425-2 and 425-3 corresponding to the webpage category, the image category and the news category are representatively shown in FIG. 17 for example.

If one of the category indicators 425 is selected, a search is performed by taking the selected category as a search range. The search by taking the selected category as a search range will be explained later.

Moreover, in an example where the text input box 410 is performing the search function, an automatic execution indicator 428 can be displayed on the touchscreen to indicate that a result object of maximum con-elation or maximum access frequency among the result objects of the search can be automatically executed.

If the automatic execution indicator 428 is selected, the result object of the maximum correlation or the maximum access frequency among the search result objects is automatically executed.

In the following description, a process for performing a search function as a search is explained in detail for example.

In particular, explained is an example where a search for determining a search category after completion of a keyword input is performed.

First of all, for a search function, a terminal user selects the text input box 410.

Subsequently, a prescribed keyword, as shown in (17-2) of FIG. 17, is inputted to the text input box 410 via the user input unit 130. Alternatively, when the text input box 410 is selected, the virtual keypad is created on the touchscreen. And, a prescribed keyword can be inputted via the created virtual keypad.

After the keyword has been inputted, if a command for executing the Google search for the keyword is inputted, a result of the search corresponding to the keyword, as shown in (17-3) of FIG. 17, is displayed.

The command for executing the search can be given in a manner of performing a corresponding key manipulation (e.g., soft key manipulation) of the user input unit or touching the function indicator 420 short. In this case, the search is performed on the entire categories.

Alternatively, the command for executing the search can be given in a manner of touching a corresponding one of the category indicators 425 (e.g., short touch). In this case, the search is performed on the corresponding category.

Alternatively, the command for executing the search can be entered by touching the automatic search indicator 428 (e.g., via a short touch). In an aspect where the search is performed through the automatic search indicator 428, the search result objects shown in (17-3) of FIG. 17 are not displayed. Instead, the result object of the maximum correlation or the maximum access frequency, as shown in (17-6) of FIG. 17, among the search result objects can be configured to be displayed in a manner of being automatically executed.

If one of the search result objects, as shown in (17-3) of FIG. 17, is selected, the selected search result object, as shown in (17-6) of FIG. 17 can be configured to be executed and displayed.

In the following description, a process for performing a search, for which a search category is determined prior to a keyword input, is explained in detail for example.

First of all, one of the category indicators 425 is selected by being touched (e.g., long touch). If so, a search category according to the selected category indicator is previously determined. In this case, the selected category indicator can be displayed in a manner of being visually discriminated from other indicators.

After the keyword input box 410 has been selected, a keyword is inputted to the selected keyword input box 410.

After the keyword has been inputted, if a command for executing a search for the keyword is inputted, a search by taking the selected search category as a search range is performed.

The command for executing the search can be executed by performing a corresponding key manipulation (e.g., soft key manipulation) of the user input unit or touching the function indicator 420 short.

In the following description, explained is an aspect where the terminal attempts to use the text input box 410 for the second function, e.g., an interact address input function (i.e., an internet URL (uniform resource locator) input function).

First of all, a terminal user touches long the function indicator 420 on the touchscreen 400 shown in (17-1) of FIG. 17. If so, the text input box is switched to be used for the second function [S164]. The function indicator 420, as shown in (17-2) of FIG. 17, indicates that the text input box 410 can be used for the internet URL input function or another function.

Subsequently, a prescribed internet URL, as shown in (17-5) of FIG. 17, is inputted to the text input box 410 [S165]. Alternatively, as mentioned in the foregoing description, when the text input box 410 is selected, the virtual keypad is created on the touchscreen. And, the internet URL can be inputted via the created virtual keypad.

After the internet URL has been inputted, if a command for executing an entry to the internet URL is inputted, a webpage corresponding to the internet URL, as shown in (17-6) of FIG. 17, is displayed.

The command for the entry to the internet URL can be executed by a corresponding key manipulation (e.g., soft key manipulation) of the user input unit 130 or a touch (e.g., short touch) to the function indicator 420.

The above-described first and second functions are not limited to the search function and the Internet URL input function only. For the first and second functions, two can be selected from a group including a search function for a first preset website, a search function for a second preset website, a calculator function and a file search function within the terminal.

SEVENTH EMBODIMENT

A method of controlling a mobile terminal according to a seventh embodiment of the present invention is explained with reference to FIG. 18 and FIG. 19 as follows.

Figure 18:
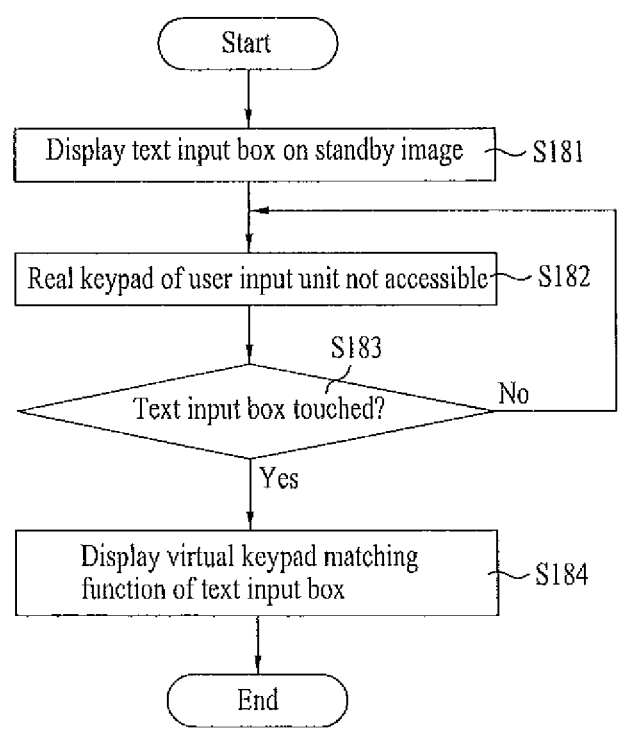
FIG. 18 is a diagram of a flowchart for a method of controlling a mobile terminal according to a seventh embodiment of the present invention.
Figure 19:
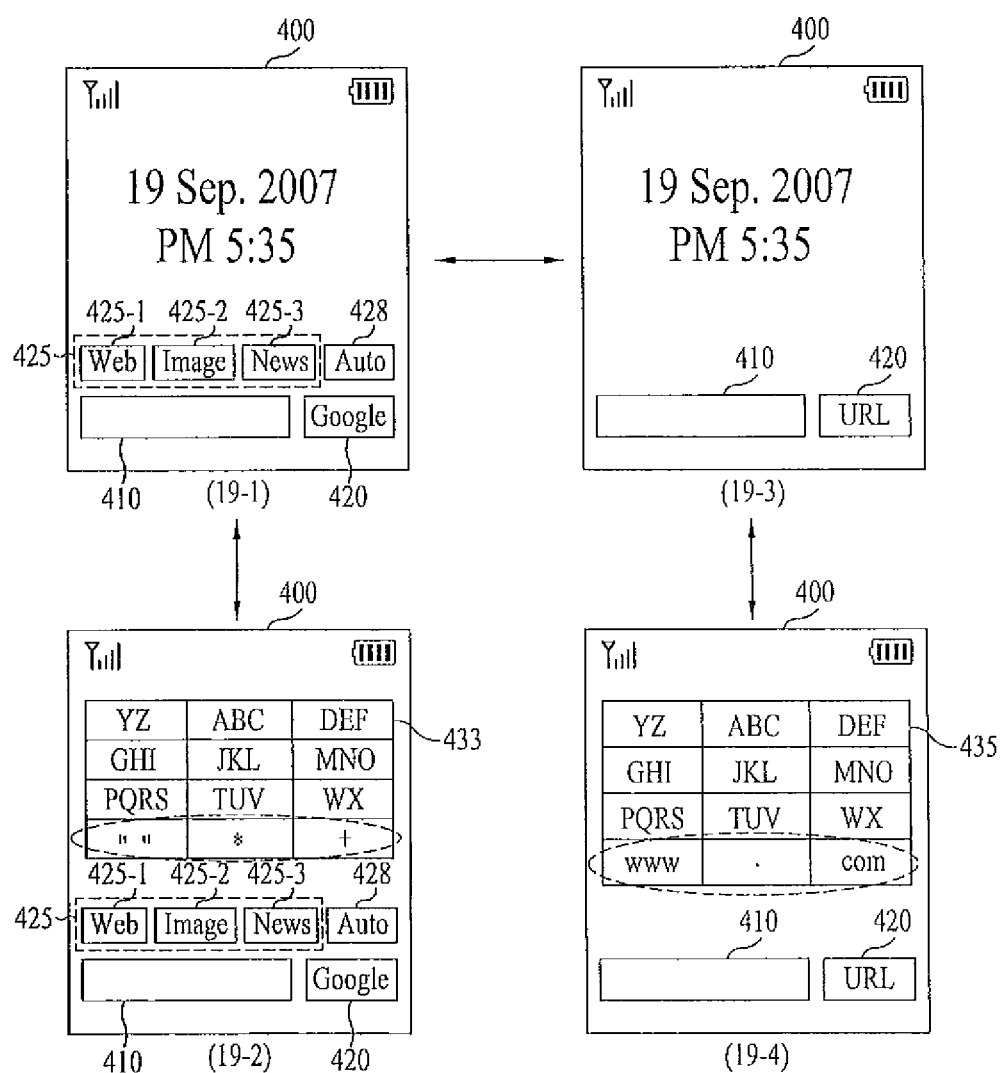
FIG. 19 is a diagram of a display screen on which a method of controlling a mobile terminal according to a seventh embodiment of the present invention is implemented.

FIG. 18 is a diagram of a flowchart for a method of controlling a mobile terminal according to a seventh embodiment of the present invention, and FIG. 19 is a diagram of a display screen on which a method of controlling a mobile terminal according to a seventh embodiment of the present invention is implemented.

Referring to (19-1) of FIG. 19, a text input box 410 for a search function is displayed on a standby image displayed on the touchscreen 400 [S181]. A function indicator 420 indicating that the text input box 410 is used for the search and other indicators 425 and 428 relevant to the search are displayed together with the text input box 410.

While the mobile terminal 100 is closed, a real keypad of the user input unit 130 for a text input is not externally exposed. Therefore, the real keypad may be accessible [S1182].

Referring to (19-2) of FIG. 19, if the text input box 410 is selected, a virtual keypad 433 is generated on the touchscreen 400 [S183, S184]. Hence, a terminal user is able to input a keyword through the generated virtual keypad.

Optionally, the generated virtual keypad can be configured to automatically disappear when the real keypad of the user input unit 130 becomes accessible (e.g., the real keypad is externally exposed as the mobile terminal is opened).

Referring to (19-3) of FIG. 19, a text input box 410 for an internet address input function is displayed on a standby image displayed on the touchscreen 400. And, a function indicator 420 indicating that the text input box 410 is used for the internet address input function is displayed together with the text input box 410.

Referring to (19-4) of FIG. 19, if the text input box 410 is selected when the real keypad is not accessible, a virtual keypad 435 is generated on the touchscreen 400. This is as good as the example shown in (19-2) of FIG. 19.

Yet, the virtual keypad shown in (19-4) of FIG. 19 needs not to be identical to the former virtual keypad 433 shown in (19-2) of FIG. 19. In particular, the generated virtual keypads can be configured to differ from each other at least in part to have forms optimal to functions for the text input boxes, respectively.

For instance, the virtual keypad 435 shown in (19-4) of FIG. 19 can be provided with a separate key button (e.g., 'www', 'com') facilitating the internet address input to be performed.

EIGHTH EMBODIMENT

In the sixth embodiment of the present invention, a single text input box is displayed on the standby image and the displayed text input box is usable for two kinds of functions. Yet, the text input box of the present invention is further usable for at least three kinds of functions. This is explained in detail with reference to an eighth embodiment of the present invention shown in FIG. 20 as follows.

Figure 20:
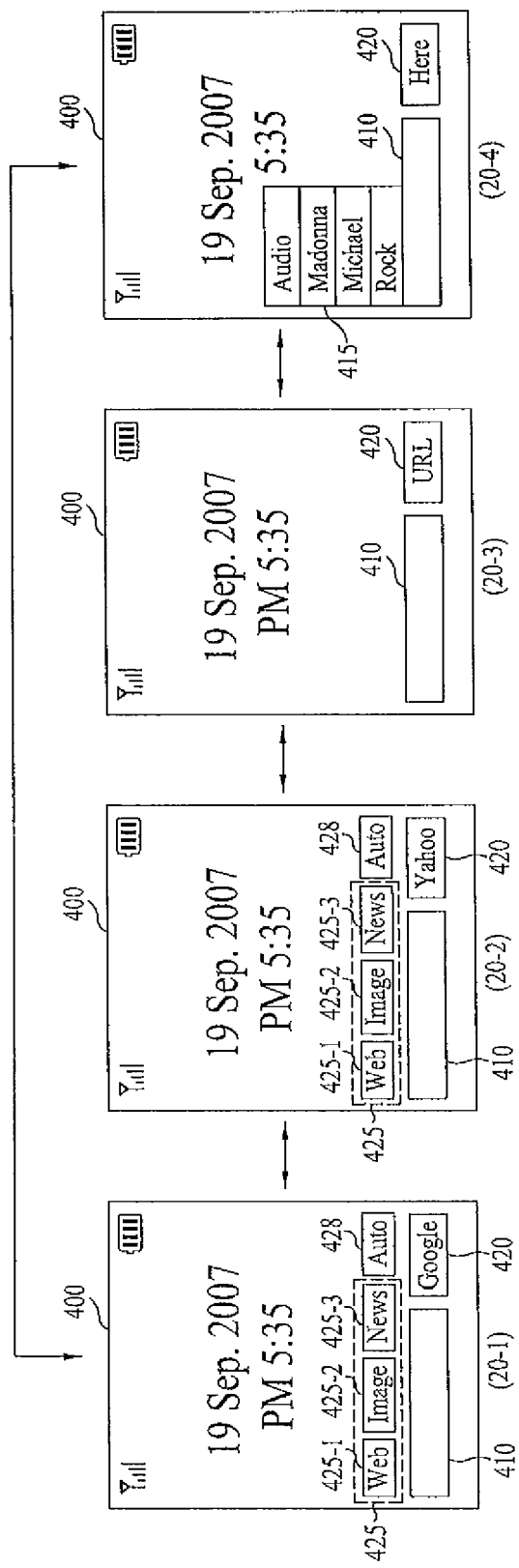
FIG. 20 is a diagram of a display screen on which a method of controlling a mobile terminal according to an eighth embodiment of the present invention is implemented.

FIG. 20 is a diagram of a display screen on which a method of controlling a mobile terminal according to an eighth embodiment of the present invention is implemented.

Referring to (20-1) of FIG. 20, a text input box 410 is displayed on a standby image displayed on the display screen 400 of the mobile terminal 100. And, a function indicator 420 indicating a function to be used for the text input box 410 is displayed on the standby image together with the text input box 410.

The function indicator 420 shown in (20-1) of FIG. 20 indicates that the text input box 410 is usable for a first function (e.g., a search function for a first preset website).

Referring to (20-2) of FIG. 20, if the function indicator 420 is long-touched or a corresponding key manipulation is performed on the user input unit 140, the function indicator 420 indicates that the text input box 410 is usable for a second function (e.g., a search function for a second preset website).

Referring to (20-3) and (20-4) of FIG. 20, similarly, if the function indicator 420 is touched for more than a predetermined amount of time or each time a corresponding key manipulation is performed on the user input unit 140, the function indicator 420 indicates that the text input box 410 is usable for a third function (e.g., an internet address input function) and a fourth function (e.g., a file search function within the terminal) in turn.

Hence, a terminal user is able to change a function of the text input box 410 in response to a length of a touch to the function indicator 420 or performing a corresponding key manipulation on the user input unit 130 until a necessary function is assigned to the text input box 410.

Referring to (20-4) of FIG. 20, when the text input box 410 is touched double for example, it is able to consider a configuration that a list 415 of texts recently inputted to the text input box 410 is displayed.

And, it is also able to consider a configuration that the number of functions used for the text input box 410 can be preset through a menu manipulation of the mobile terminal.

NINTH EMBODIMENT

In the above description of the former embodiments, various schemes for facilitating the internet search on the standby image are explained. In the description of the present embodiment of the present invention, explained is a scheme for facilitating a terminal user to keep performing the internet search after a result object of the internet search has been displayed on a standby image.

Figure 21:
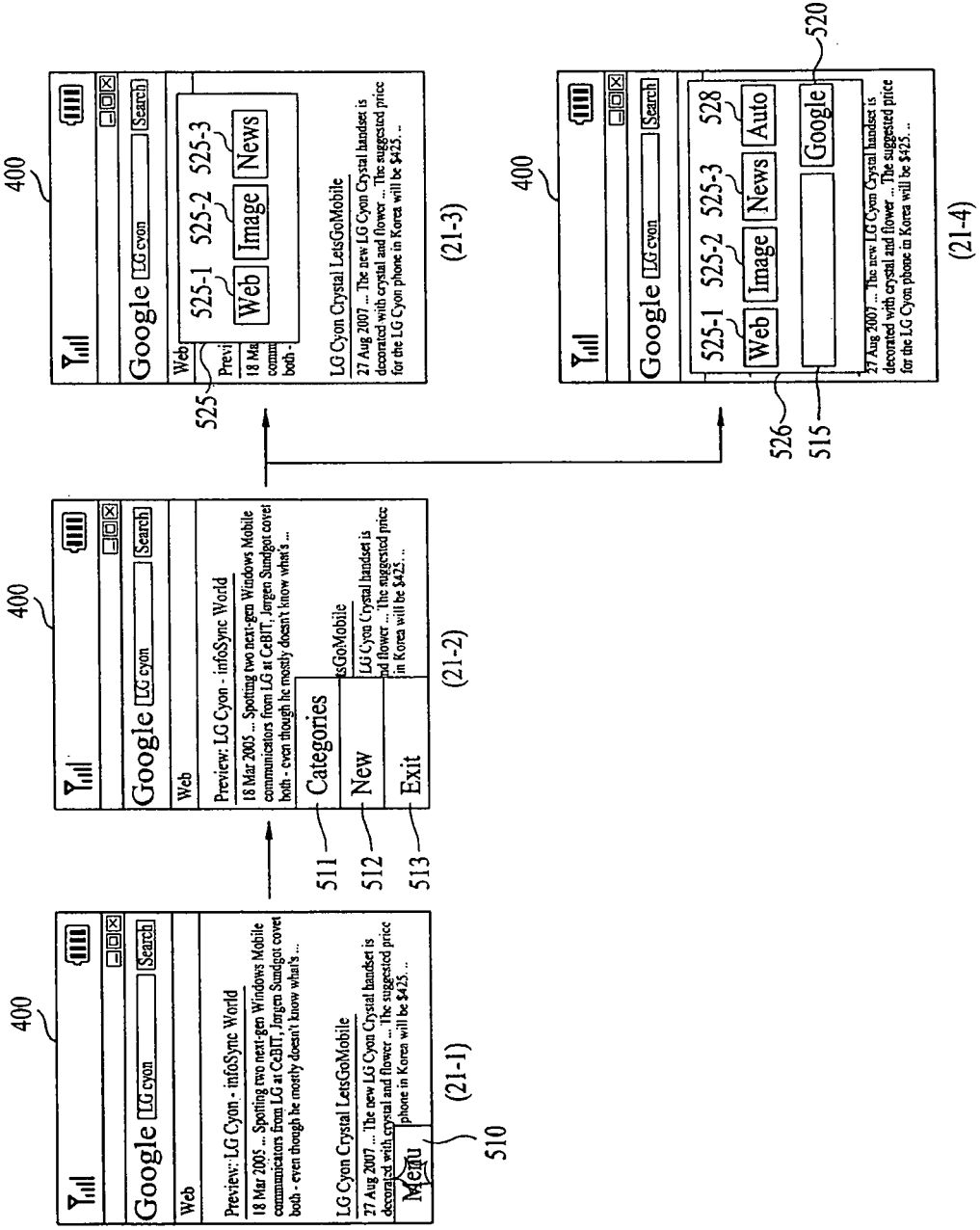
FIG. 21 is a diagram of a display screen on which a method of controlling a mobile terminal according to a ninth embodiment of the present invention is implemented.

FIG. 21 is a diagram of a display screen on which a method of controlling a mobile terminal according to a ninth embodiment of the present invention is implemented.

Referring to (21-1) of FIG. 21, an internet search result object using a prescribed keyword is displayed on the touchscreen 400. A menu icon 510 on the touchscreen 400 is then selected.

Referring to (21-2) of FIG. 21, submenus relevant to the internet search are displayed. In order to display the submenus 511, 512 and 513, it is not necessary to configure the menu icon 510 on the touchscreen 400 to be selected. For instance, the submenus can be configured to be displayed via corresponding key manipulation (e.g., navigation key manipulation, soft key manipulation, side key manipulation) of the user input unit 130.

First of all, a category switching submenu ('Categories') 511 among the submenus is described as follows. If the category switching submenu 511 is selected, as shown in (21-2) of FIG. 21, a category switching window 525 for the category switching is displayed on the touchscreen 400.

If a prescribed category is selected from categories 525-1, 525-2 and 525-3 in the category switching window 525, a result object for the prescribed keyword in the selected category is displayed on the touchscreen 400.

Secondly, a new keyword input submenu ('New') 512 among the submenus is explained as follows.

If the new keyword input submenu 511 is selected, as shown in (21-3) of FIG. 21, a new keyword input window 526 for the new keyword input is displayed on the touchscreen 400. The usage of the new keyword input window 526 is already described with reference to FIG. 17. Its detailed description is omitted in the following description.

Finally, an end submenu ('exit') 513 among the submenus is explained as follows. If the end submenu 513 is selected, the screen 400 returns to the standby image shown in (21-1) of FIG. 21.

TENTH EMBODIMENT

Figure 22:
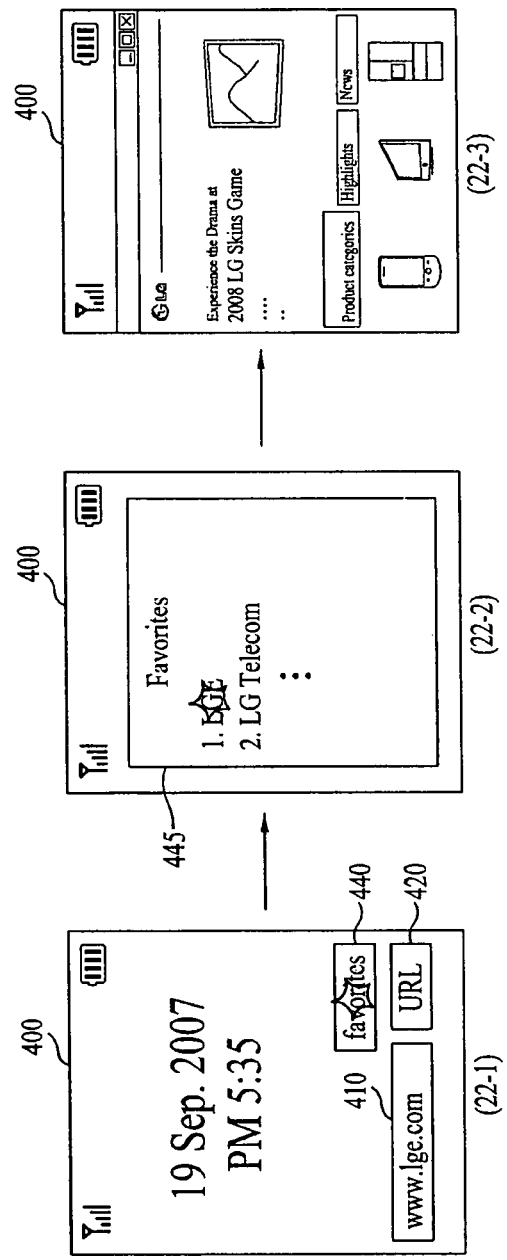
FIG. 22 is a diagram of a display screen on which a method of controlling a mobile terminal according to a tenth embodiment of the present invention is implemented.

FIG. 22 is a diagram of a display screen on which a method of controlling a mobile terminal according to a tenth embodiment of the present invention is implemented.

Referring to (22-1) of FIG. 22, as the function indicator 420 is manipulated on the touchscreen 400, the text input box 410 can be used for an internet URL input function or another function.

In an aspect where the text input box 410 is used for the internet URL input function, a bookmark icon 440, a shown in (22-1) of FIG. 22, is further displayed on the touchscreen 400.

Referring to (22-2) of FIG. 22, if the bookmark icon 440 is selected by being touched, a bookmark list window 445 is displayed.

Referring to (22-3) of FIG. 22, if a prescribed internet site is selected from the bookmark list window 445, the selected prescribed internet site is displayed on the touchscreen 400.

ELEVENTH EMBODIMENT

Figure 23:
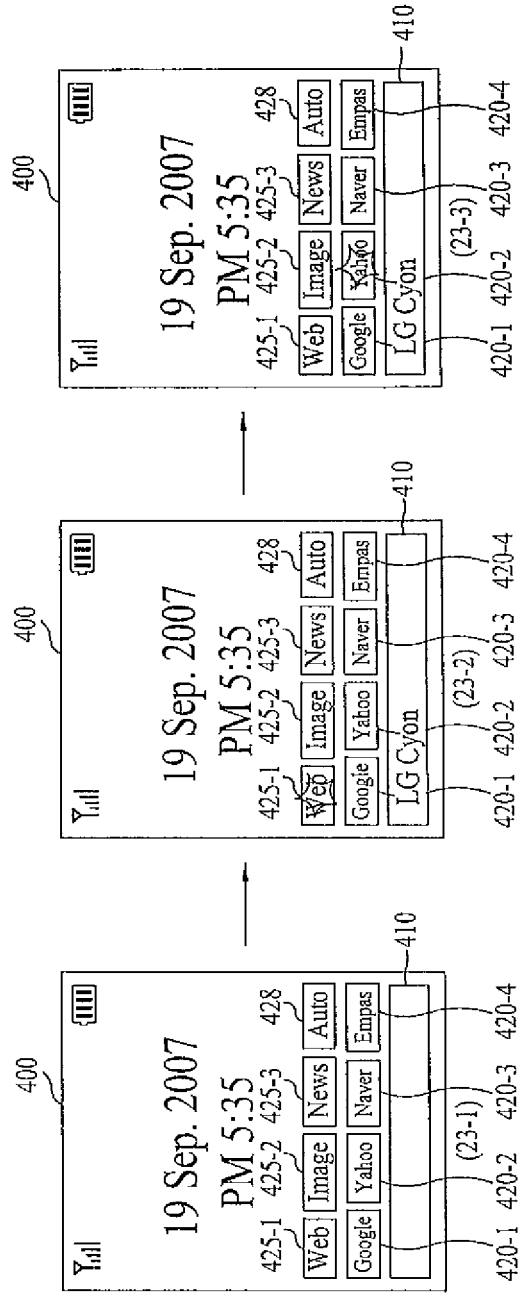
FIG. 23 is a diagram of a display screen on which a method of controlling a mobile terminal according to an eleventh embodiment of the present invention is implemented.

FIG. 23 is a diagram of a display screen on which a method of controlling a mobile terminal according to an eleventh embodiment of the present invention is implemented.

Referring to (23-1) of FIG. 23, a text input field 410, a plurality of search engine indicators 420-1, 420-2, 420-3 and 420-4 respectively indicating functions of the text input field, category indicators 425-1, 425-2 and 425-3 for determining search categories respectively and an automatic execution indicator 428 are displayed on the touchscreen 400.

Referring to (23-2) of FIG. 23, after a prescribed keyword has been inputted to the text input box 410, a search category is determined if one of the category indicators is selected.

Referring to (23-3) of FIG. 23, a search engine is determined if one of the search engine indicators is selected.

If so, a search for the prescribed keyword is performed on the determined search category through the determined search engine.

Meanwhile in (23-1) of FIG. 23, after a prescribed keyword has been inputted to the text input box 410, a search engine is determined in a manner that one of the search engine indicators, as shown in (23-3) of FIG. 23, is directly selected. If so, a search for prescribed keyword is performed on the entire categories through the determined search engine.

Accordingly, the present invention provides the following effects or advantages.

First of all, according to at least one of the embodiments of the present invention, a text input box usable for at least two functions is displayed on a standby image of a mobile terminal or a web browser. Hence, a terminal user is able to directly input a specific text to the text input box on the standby image or web browser in accordance with a specific function.

Secondly, according to at least one of the embodiments of the present invention, a text input box and a virtual keypad matching a function of the text input box are displayed on a standby image of a mobile terminal or a web browser. Hence, a terminal user is facilitated to input a specific text to the text input box using the virtual keypad.

It will be apparent to those skilled in the art that various modifications and variations can be made in the present invention without departing from the spirit or scope of the inventions. For instance, the above-described methods can be implemented in a program recorded medium as computer-readable codes. The computer-readable media include all kinds of recording devices in which data readable by a computer system are stored. The computer-readable media include ROM, RAM, CD-ROM, magnetic tapes, floppy discs, optical data storage devices, and the like for example and also include carrier-wave type implementations (e.g., transmission via Internet). And, the computer can include the control unit 180 of the terminal. Thus, it is intended that the present invention covers the modifications and variations of this invention provided they come within the scope of the appended claims and their equivalents.

What is claimed is:

1. A mobile terminal, comprising:
a touchscreen;
a wireless communication unit configured to establish an Internet access;
an input unit configured to receive an input from a user; and
a controller configured to:
display on the touchscreen a text input box on a standby image, the text input box usable for selectively searching a first search category and a second search category;
display a current category indicator at a designated location which is one side of the text input box, and the current category indicator indicating a current search category of the text input box;
receive a text input into the text input box for searching the input text;
send the text input to a search program;
receive a search result from the search program; and
display the search result on the touch screen;
wherein, in response to changing the current search category of the text input box from the first search category to the second search category, an appearance of the current category indicator for the text input box is changed to indicate the changed search category,
wherein the changed appearance of the current category indicator is displayed at the same designated location with the text input box,
wherein the controller is further configured to preserve the input text in the text input box even after the current search category for the input text is changed between the first and second search categories,
wherein the first search category is for searching the same input text via the Internet access, and the second search category is for searching the same input text within the mobile terminal,
wherein the controller is further configured to display a matched one of two different virtual keypads for the same text input box on the touchscreen before the text input into the text input box and in response to selection of the text input box,
wherein the matched virtual keypad is selected between the two different virtual keyboards according to the current search category of the same text input box on the touchscreen, and wherein the controller is further configured to:
    display icons for sub search categories in addition to the current category indicator when the current search category is the first search category for searching via the Internet access, and
    render the icons for the sub search categories to disappear when the current search category is changed from the first search category to the second search category for searching within the mobile terminal.

2. The mobile terminal of claim 1, wherein the changed appearance of the current category indicator is displayed while the text is input into the text input box for the changed search category.

3. The mobile terminal of claim 1, wherein the text input box is displayed on the standby image in a standby mode.

4. The mobile terminal of claim 1, wherein the sub search categories for the first search category include at least one of a webpage category, and image category, a moving picture category, a dictionary category, a news category, and a blog category.

5. The mobile terminal of claim 1, wherein the input unit further comprises a real keypad, and
    wherein, in response to selection of the text input box after the real keypad has become inactivated, the controller is further configured to display the virtual keypad.

6. The mobile terminal of claim 1, wherein the input unit further comprises a real keypad, and
    wherein, in response to exposure of the real keypad after the text input box is selected, the controller is further configured to cause the displayed virtual keypad to disappear.

7. A method of controlling a mobile terminal, the method comprising:
    establishing an Internet access via a wireless connection;
    displaying, by the mobile terminal, a text input box on a standby image of the mobile terminal, the text input box usable for selectively searching a first search category and a second search category;
    displaying, by the mobile terminal, a current category indicator at a designated location which is one side of the text input box, the current category indicatory indicating a current search category of the text input box;
    receiving a text input into the text input box for searching the input text;
    sending the text input to a search program;
    receiving a search result from the search program; and
    displaying a search result on a screen of the mobile terminal;
    wherein, in response to changing the current search category of the text input box is changed from the first search category to the second search category, an appearance of the current category indicator for the text input box is changed to indicate the changed search category,
    wherein the changed appearance of the current category indicator is displayed at the same designated location with the text input box,
    wherein the input text is preserved in the text input box even after the current search category for the input text is changed between the first and second search categories,
    wherein the first search category is for searching the same input text via the Internet access, and the second search category is for searching the same input text within the mobile terminal,
    wherein the method further comprises displaying a matched one of two different virtual keypads for the same text input box on the touchscreen before the text input into the text input box and in response to selection of the text input box,
    wherein the matched virtual keypad is selected between the two different virtual keyboards according to the current search category of the same text input box on the touchscreen, and
    wherein the method further comprises:
        displaying icons for sub search categories in addition to the current category indicator when the current search category is the first search category for searching via the Internet access; and
        rendering the icons for the sub search categories to disappear when the current search category is changed from the first search category to the second search category for searching within the mobile terminal.

8. The method of claim 7, wherein the changed appearance of the current category indicator is displayed while the text is input into the text input box for the changed search category.

9. The method of claim 7, wherein the text input box is displayed on the standby image in a standby mode.

10. The method of claim 7, wherein the sub search categories for the first search category include at least one of a webpage category, an image category, a moving picture category, a dictionary category, a news category, and a blog category.

11. The method of claim 7, further comprising:
    displaying the virtual keypad when the text input box is selected after a real keypad has become inactivated.

12. The method of claim 7, further comprising:
    causing the displayed virtual keypad to disappear when a real keypad is externally exposed after the text input box is selected.

13. The mobile terminal of claim 1, wherein, in response to selection of the text input box for inputting the text therein, the controller is further configured to display a list of texts recently inputted to the selected text input box.

14. The method of claim 7, further comprising displaying a list of texts recently inputted to the selected text input box in response to selection of the text input box for inputting the text therein.

15. The mobile terminal of claim 1, wherein the controller is further configured to display the same input text within a different text input box together with the search result corresponding to the input text.

16. The mobile terminal of claim 1, wherein the controller is further configured to display a webpage corresponding to a URL, when the URL is input into the same text input box and a command for processing the input URL is received.

17. The mobile terminal of claim 5, wherein the real keypad is inactivated by not being externally exposed.

18. The method of claim 7, further comprising:
    displaying the same input text within a different text input box together with the search result corresponding to the input text.

19. The method of claim 7, further comprising:
    displaying a webpage corresponding to a URL, when the URL is input into the same text input box and a command for processing the input URL is received.

20. The method of claim 11, wherein the real keypad is inactivated by not being externally exposed.

* * * * *